US006577937B1

(12) United States Patent
Shuman et al.

(10) Patent No.: US 6,577,937 B1
(45) Date of Patent: Jun. 10, 2003

(54) METHOD AND SYSTEM FOR AN IN-VEHICLE COMPUTING ARCHITECTURE

(75) Inventors: Valerie Shuman, Harwood Heights, IL (US); Cynthia Paulauskas, Chicago, IL (US); T. Russell Shields, Chicago, IL (US); Richard J. Weiland, Evanston, IL (US); John C. Jasper, Arlington Hts, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 10/210,292

(22) Filed: Aug. 1, 2002

Related U.S. Application Data

(63) Continuation of application No. 10/090,330, filed on Mar. 4, 2002, which is a continuation of application No. 09/706,943, filed on Nov. 6, 2000, now Pat. No. 6,353,785, which is a continuation of application No. 09/268,162, filed on Mar. 12, 1999, now Pat. No. 6,161,071.

(51) Int. Cl.[7] .......................... B60R 22/00; E05F 15/00; G05D 1/00; G05D 3/00; G06F 17/00; G06F 7/00
(52) U.S. Cl. ........................................................ 701/48
(58) Field of Search ........................... 701/48, 300, 23, 701/25, 202, 205, 210, 33, 36; 340/988, 436, 901

(56) References Cited

U.S. PATENT DOCUMENTS

| 4,754,402 A | 6/1988 | Wand |
| 4,829,434 A | 5/1989 | Karmel et al. |

(List continued on next page.)

FOREIGN PATENT DOCUMENTS

| EP | 0 745 788 A1 | 12/1996 |
| EP | 0 795 700 A2 | 9/1997 |

OTHER PUBLICATIONS

Casparsson et al. "Volcano a revolution in on–board communications," (1998) http://www.tech2.volvo.se/reportage/9811volcano/main.htm.
Melin, "Volvo S80 Electrical system of the future," http://www.tec2.volvo.se/reportage/9811electrical/main.htm (1998).

*Primary Examiner*—Yonel Beaulieu
(74) *Attorney, Agent, or Firm*—Frank J. Kozak; Jon D. Shutter; Lawrence M. Kaplan

(57) ABSTRACT

A computing architecture for a motorized land-based vehicle is disclosed. The computing architecture includes a data network comprised of a plurality of interconnected processors, a first group of sensors responsive to environmental conditions around the vehicle, a second group of sensors responsive to the vehicle's hardware systems, and a map database containing data that represent geographic features in the geographic area around the vehicle. A vehicle-environment modeling program, executed on the data network, uses the outputs from the first and second groups of sensors and the map database to provide and continuously update a data model that represents the vehicle and the environmental around the vehicle, including geographic features, conditions, structures, objects and obstacles around the vehicle. Vehicle operations programming applications, executed on the data network, use the data model to determine desired vehicle operation in the context of the vehicle's environment. A driver interface receives the vehicle driver's input. Vehicle control programming, executed on the data network, receives outputs from the vehicle operations programming applications and the driver interface, determines a resolved operation for the vehicle's hardware systems and provides output commands indicative thereof. The vehicle operations programming applications may include adaptive cruise control, automated mayday, and obstacle and collision warning systems, among others. Also disclosed is a new computing architecture that organizes the applications and systems in the vehicle into two groups: driver assistance systems and mobile services and information systems. Also disclosed is a drive recorder that maintains records of the statuses of all vehicle systems and of the driver.

24 Claims, 29 Drawing Sheets

U.S. PATENT DOCUMENTS

| | | |
|---|---|---|
| 5,146,219 A | 9/1992 | Zechnall |
| 5,220,497 A | 6/1993 | Trovato et al. |
| 5,243,524 A | 9/1993 | Ishida et al. |
| 5,247,440 A | 9/1993 | Capurka et al. |
| 5,315,295 A | 5/1994 | Fujii |
| 5,390,118 A | 2/1995 | Margolis et al. |
| 5,408,411 A | 4/1995 | Nakamura et al. |
| 5,420,794 A | 5/1995 | James |
| 5,448,487 A | 9/1995 | Arai |
| 5,485,161 A | 1/1996 | Vaughn |
| 5,485,381 A | 1/1996 | Heintz et al. |
| 5,504,482 A | 4/1996 | Schreder |
| 5,539,397 A | 7/1996 | Asanuma et al. |
| 5,546,311 A | 8/1996 | Sekine |
| 5,570,087 A | 10/1996 | Lemelson |
| 5,572,449 A | 11/1996 | Tang et al. |
| 5,983,161 A | 11/1999 | Lemelson et al. |
| 6,141,710 A | 10/2000 | Miesterfeld |
| 6,182,171 B1 | 1/2001 | Akatsuka et al. |

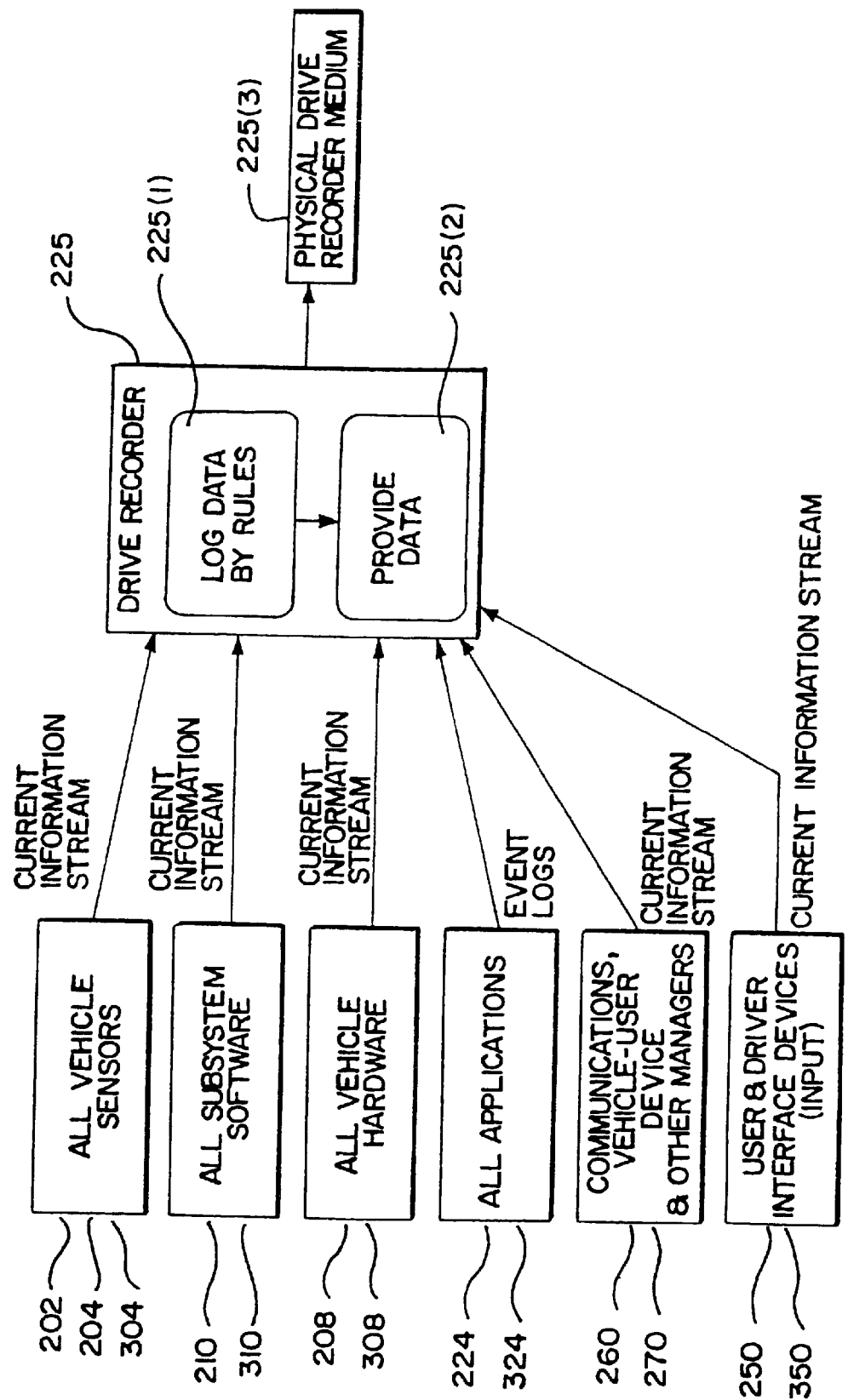

METHOD AND SYSTEM FOR AN IN-VEHICLE COMPUTING ARCHITECTURE

REFERENCE TO RELATED APPLICATIONS

The present application is a continuation of Ser. No. 10/090,330, filed Mar. 4, 2002, which was a continuation of Ser. No. 09/706,943, filed Nov. 6, 2000, now U.S. Pat. No. 6,353,785, which was a continuation of Ser. No. 09/268,162 filed Mar. 12, 1999, now U.S. Pat. No. 6,161,071, the entire disclosures of which are incorporated herein by reference.

BACKGROUND OF THE INVENTION

The present invention relates to a computing architecture for vehicles and more particularly, the present invention relates to a novel computing architecture that includes modeling programming from which a data model of the vehicle and the environment around the vehicle is built, which in turn is used by vehicle operations applications to provide various functions consistently and efficiently.

Over the years, manufacturers of on-road vehicles, such as automobiles, vans, trucks, buses, and so on, have utilized computer technology to enhance the operations of existing features and functions in the vehicles as well as to provide new features and functions. For example, programmed controllers, custom-designed processors, embedded systems, and/or computer modules have been developed that support or even control various kinds of mechanical equipment in vehicles. For example, programmed controllers or computer modules have been developed that control or support various engine functions, such as fuel injection, timing, and so on. Programmed controllers or computer modules have been developed to enhance or support operation of transmission systems, suspension systems, braking systems, and so on. The sophistication of these enhancements has advanced as the processing power available for these purposes has increased. It is expected that in the future more aspects of the mechanical equipment in vehicles will be controlled or supported by processors or controllers in order to enhance performance, reliability, and safety, to reduce emissions, and so on.

Aside from using computer technology to support various mechanical functions in vehicles, processors, controllers, or other programmed computer-based technologies are used in vehicles in other ways. Car phones, entertainment equipment (such as CD players), in-vehicle navigation systems, and emergency roadside assistance systems are examples. In addition, new kinds of equipment that provide entirely new features may become available in vehicles. For example, vehicles may include radar systems that detect obstacles on the road ahead and then automatically brake the vehicle to prevent accidents. Another example is an in-vehicle email system that automatically downloads and reads the driver's email. These new kinds of equipment are likely to include one or more processors and appropriate programming.

These new kinds of equipment hold the promise of making the operation of a vehicle safer, more reliable, less polluting, and more enjoyable. However, there are several considerations related to providing these kinds of features that constrain implementation. One consideration relates to enabling the various processor-controlled equipment to work together. Although many of these processor-controlled kinds of equipment can be (and have been) implemented piecemeal, there exists the possibility that operation of some equipment may conflict with operation of other equipment. This possibility may increase in the future as more kinds of processor-controlled equipment are provided in vehicles.

Another consideration relates to the need to provide fail-safe and back-up features as users increase their reliance on these features. Still another consideration is that as the number of processor-controlled kinds of equipment provided in a vehicle increases, there exists an opportunity for efficiencies resulting from shared resources that enable overall costs to be decreased. A still further consideration is that as more processor-controlled equipment is provided in a vehicle, synergistic benefits may arise from sharing resources.

SUMMARY OF THE INVENTION

To address the above concerns, the present invention comprises a computing architecture for a motorized land-based vehicle. The computing architecture includes a data network comprised of a plurality of interconnected processors, a first group of sensors responsive to environmental conditions around the vehicle, a second group of sensors responsive to the vehicle's hardware systems, and a map database containing data that represent geographic features in the geographic area around the vehicle. A vehicle-environment modeling program, executed on the data network, uses the outputs from the first and second groups of sensors and the map database to provide and continuously update a data model that represents the vehicle, past, present, and future environmental conditions around the vehicle, and geographic features, including structures, objects and obstacles around the vehicle. Vehicle operations programming applications, executed on the data network, use the data model to determine desired vehicle operation in the context of the vehicle's past, present, and future environment. A driver interface receives the vehicle driver's input. Vehicle control programming, executed on the data network, receives outputs from the vehicle operations programming applications and the driver interface, determines a resolved operation for the vehicle's hardware systems and provides output commands indicative thereof. The vehicle operations programming applications may include adaptive cruise control, automated mayday, and obstacle and collision warning systems, among others. Also supported is a drive recorder that maintains records of the statuses of all vehicle systems and of the driver.

According to another aspect, a new computing architecture for a vehicle is disclosed. The computing architecture organizes the applications and systems in the vehicle into two groups. The systems and applications in the first group are the driver assistance systems. The driver assistance systems include critical mobility-related and safety-related systems, such as the engine, brakes, airbags, and so on, as well as the software that supports these systems. The systems in the second group are the mobile services and information systems. The mobile services and information systems provide for driver and passenger convenience, entertainment, non-emergency communication, and navigation. The first and second groups communicate with each other through an internal firewall system. The internal firewall system assures that operations of the driver assistance systems are not compromised by operations of the mobile services and information systems. The driver assistance systems and the mobile services and information systems can exchange information with one or more external networks using a wireless communications system of the vehicle. A second firewall system prevents unauthorized and/or unwanted external data transmissions from interfering with the driver assistance systems and the mobile services and information systems.

BRIEF DESCRIPTION OF THE DRAWINGS

FIG. 29 is a logical data flow diagram illustrating the component processes that form the drive recorder shown in FIG. 2.

DETAILED DESCRIPTION OF THE PRESENTLY PREFERRED EMBODIMENTS

I. Overview of Network Environment

In a first embodiment, an in-vehicle computing architecture is disclosed that enables the provision of safety-enhancing and convenience-enhancing features and services in a vehicle. The in-vehicle computing architecture is a high-integrity, non-stop system that meets stringent requirements for the reliability of hardware, operating software, and key applications. One of the features enabled by the in-vehicle computing architecture is a vehicle-environment modeling program. The vehicle-environment modeling program maintains a data model that precisely describes the vehicle, the past, present, and predicted future environment around the vehicle, and where the vehicle is located relative to the environment around the vehicle. The description of the vehicle in the data model includes a description of the conditions and status within the vehicle, including the driver and passengers. The data model description of the environment around the vehicle includes roadway geometry, road conditions, traffic conditions, obstacles, and other vehicles.

Figure 1:
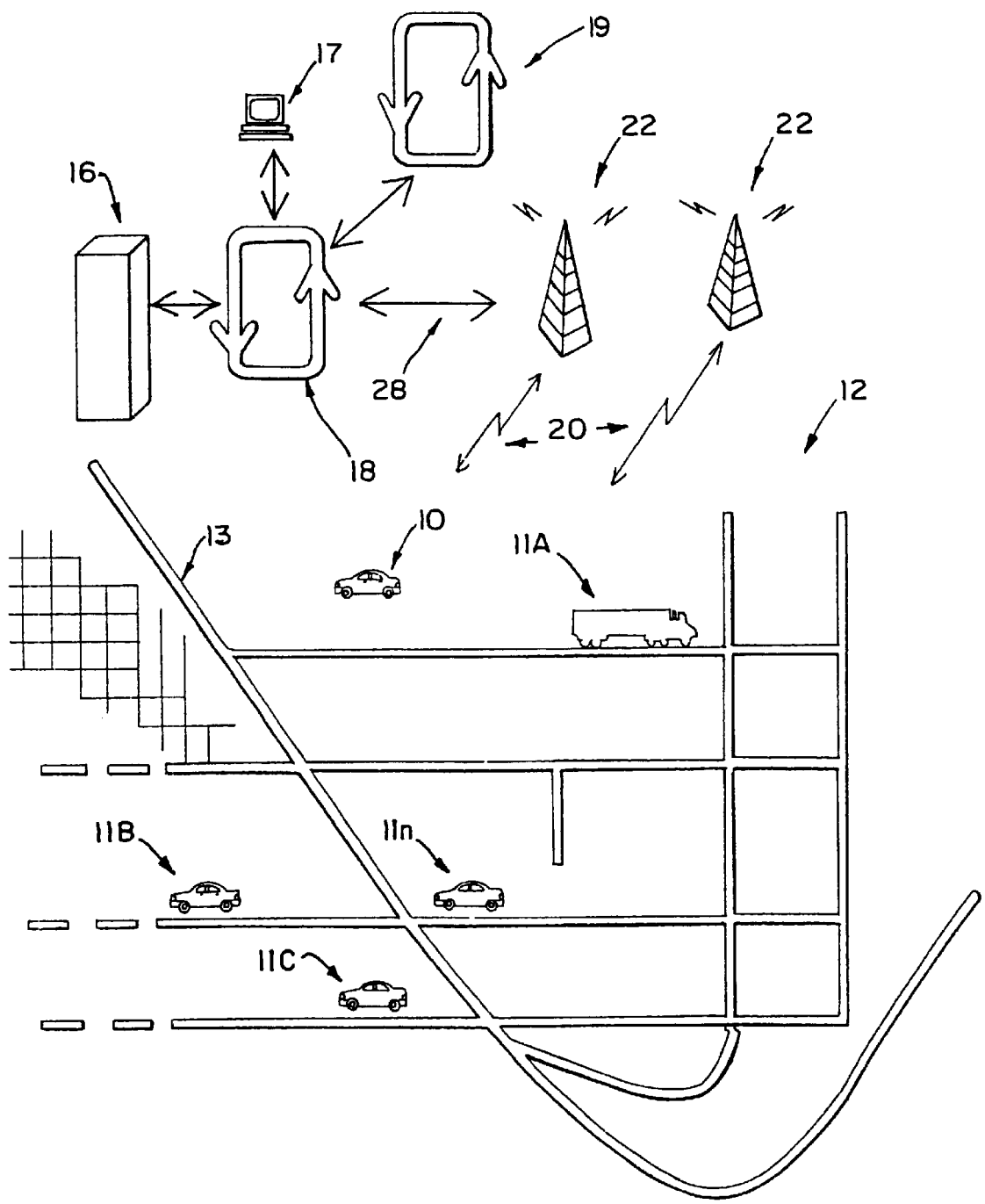
FIG. 1 is a diagram illustrating a geographic area including a plurality of vehicles, some of which include an in-vehicle computer network architecture according to a first embodiment.

Referring to FIG. 1, there is a diagram illustrating a vehicle 10. The vehicle 10 is located in a multiple vehicle environment 12. Located in the multiple vehicle environment 12 are a plurality of other vehicles 11A, 11B, 11C . . . 11n. The multiple vehicle environment 12 includes a road network 13. The geographic region may correspond to a metropolitan or rural area, a state, a country, or combinations thereof The multiple vehicle environment 12 may include more than one such geographic region. The multiple vehicle environment 12 may also include off-road portions of a geographic region.

Located in the multiple vehicle environment 12 is at least one service provider 16. The service provider 16 provides remote services for the vehicle 10 when the vehicle 10 is located in the multiple vehicle environment 12. The service provider 16 may provide other functions as well, as described below. The service provider 16 may provide similar or identical remote services for some, but not necessarily all, of the other vehicles 11 located in the multiple vehicle environment 12. In alternative embodiments, there may be two or more service providers in the multiple vehicle environment, each of which may provide services for the vehicles. The services provided by different service providers may be similar or may be different.

The service provider 16 and the vehicle 10 communicate with each other over a data network 18. The other vehicles 11 in the multiple vehicle environment 12 that are serviced by the service provider 16 may also communicate with the service provider 16 over the data network 18. In addition to the service provider 16, the vehicle 10, and the other vehicles 11, there may be other stations or nodes 17 on the data network 18. These other stations or nodes 17 may be fixed stations or mobile stations. The data network 18 is linked to and/or interfaces with other networks 19. These other networks may include the Internet, telecommunications networks, private intranets, and so on.

The data network 18 may use any suitable protocols for information exchange between parties on the network. These suitable protocols include any that are currently available, such as TCP/IP, as well as protocols that become available in the future. More than one protocol may be used in the data network 18 provided that appropriate conversion is used.

At least part of the data network 18 is comprised of a wireless portion 20. The wireless portion 20 enables two-way communication between the vehicle 10 and the service provider 16 while the vehicle 10 is located anywhere in the multiple vehicle environment 12. The wireless portion 20 may be implemented by any suitable form of wireless communications, including cellular, PCS, satellite, FM, radio, or technologies that may be developed in the future.

The other vehicles 11 in the multiple vehicle environment that are serviced by the service provider 16 may also use the same means of wireless communication 20 to communicate over the data network 18 with the service provider 16. Alternatively, other vehicles that are serviced by the service provider 16 may use other means of wireless communication to connect to the data network 18 and/or communicate with the service provider 16.

The wireless portion 20 may include one or more transmitters 22, such as a transponder tower, an antenna tower, an FM tower, satellites, or other suitable means. The transmitters 22 include an appropriate communication link 28 to the service provider 16. This link 28 may be land-based or may be wireless. The transmitters 22 include suitable technology that enables two-way communication between the service provider 16 and the plurality of vehicles 11.

The vehicle 10 is equipped with a computing architecture, as described in more detail below. The computing architecture in the vehicle provides for networking of the computer systems internal to the vehicle as well as networking of the systems in the vehicle with computer systems outside the vehicle, such as the data network 18. Some or all of the other vehicles in the multiple vehicle environment 12 may be equipped similarly or identically to the vehicle 10. Thus, the vehicle 10 is representative of a class of vehicles equipped with network-computer-architecture enhancements.

II. In-Vehicle Computing Architecture

A. OVERVIEW

Figure 2:
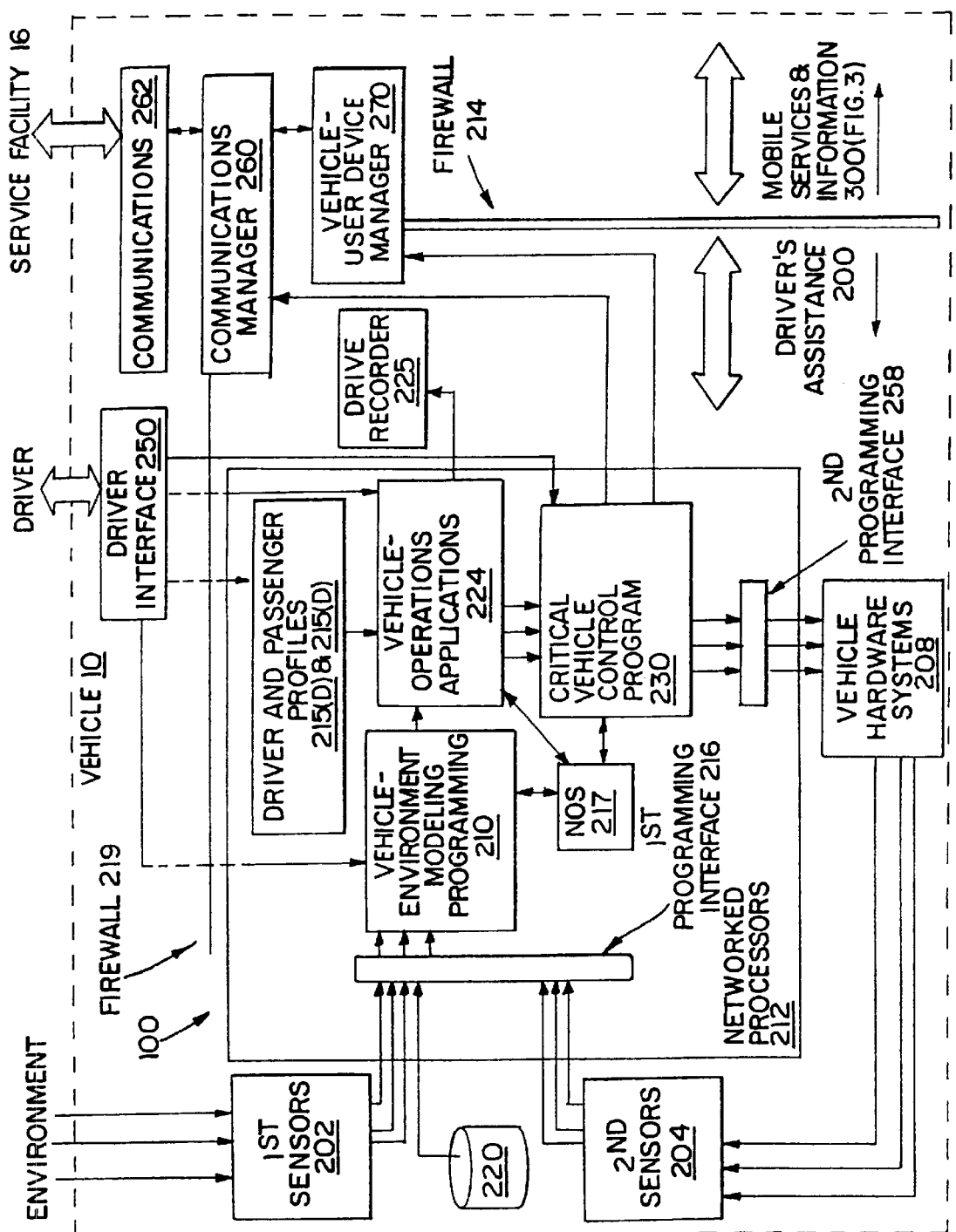
FIG. 2 is a logical block diagram illustrating the driver assistance portion of an in-vehicle computer system architecture for one of the vehicles shown in FIG. 1.
Figure 3:
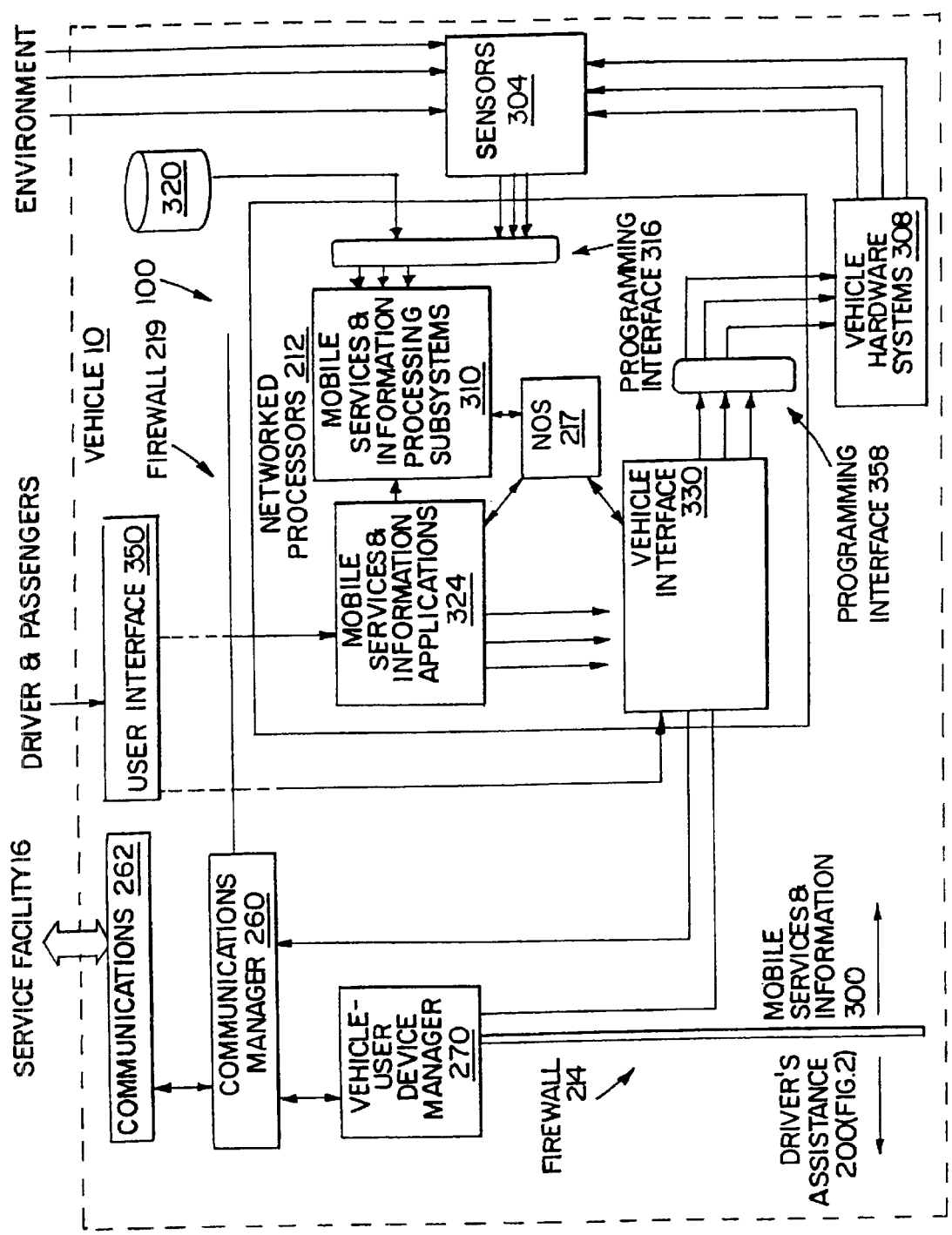
FIG. 3 is a logical block diagram illustrating the mobile services and information portion of the in-vehicle computer system architecture shown in FIG. 2.

FIGS. 2 and 3 show a logical block diagram of the new computing system architecture (labeled generally 100), for a land-based vehicle 10. The architecture shown in FIGS. 2 and 3 provides an organization for the various computing systems in the vehicle that support the vehicle hardware and other systems and equipment in the vehicle 10. The computing systems in the vehicle 10 include both hardware and software components. The in-vehicle computing architecture 100 facilitates operation of the various hardware and software equipment and systems in the vehicle, thereby enabling them to work together in a coordinated manner. Further, the in-vehicle system 100 enables the provision of enhanced features and services in the vehicle.

As shown in FIGS. 2 and 3, a plurality of software programs and applications provide various features and functions. The plurality of software programs and applications run on a plurality of processors 212 included in the vehicle 10. The processors 212 are interconnected in a data network so that the plurality of programs and applications can be executed on one or more of the plurality of processors 212.

In a present embodiment, the in-vehicle computing architecture 100 provides a framework that enables different programs and applications in the vehicle 10 to share information while avoiding conflicts. The computing architecture 100 accomplishes this, in part, by establishing priorities and providing a consistent architecture. FIGS. 2 and 3 show that the in-vehicle computing architecture 100 organizes the programs and applications running in the vehicle 10 into two groupings. A first grouping 200, shown in FIG. 2, relates to driver assistance applications and systems. A second grouping 300, shown in FIG. 3, relates to mobile information and services. The programs and applications in these two groupings can share data. However, the programs and applications in these two groupings are logically separated from each other by a first or internal firewall system 214. The internal firewall system 214 preserves the driver assistance applications and systems 200 from interference from or resource contention with the mobile information and services applications and systems 300. The in-vehicle computing architecture 100 also provides a second or external firewall system 219. The external firewall system 219 provides protection for the entire in-vehicle computing system architecture 100, including both the driver assistance systems 200 and the mobile services and information systems 300, from external interference from the outside world.

The in-vehicle computing architecture 100 also provides for redundancies and backups of certain functions and equipment in the vehicle. The in-vehicle computing architecture 100 enables certain functions and equipment to be afforded priority in a networked system environment. The in-vehicle computing architecture 100 enables the provision of safety-enhancing and convenience-enhancing equipment and services in the vehicle 10.

Referring first to the driver assistance applications and systems 200 in FIG. 2, the vehicle 10 includes a first group of sensors 202 and a second group of sensors 204. The first group of sensors 202 monitors the environment and conditions around the vehicle 10. The second group of sensors 204 monitors the mechanical systems 208 of the vehicle. Vehicle-environment modeling programming 210 is implemented on one or more of the plurality of networked programmable processors 212. The vehicle-environment modeling programming 210 receives the outputs of the first group of sensors 202 and the second group of sensors 204 via a sensor (or first) programming interface 216. The vehicle-environment modeling programming 210 also uses data from a geographic database 220. The geographic database 220 includes data that represent geographic features in the geographic area around the vehicle. The vehicle-environment modeling programming 210 uses the data from the geographic database 220 in combination with the outputs from the first and second groups of sensors 202 and 204 to generate and continuously update a data model (shown at 213 in FIG. 5, below) of the vehicle 10 in its environment. The data model 213 represents a fusion of the sensor data and the data from the map database. The data model generated by the vehicle-environment modeling programming 210 is used by vehicle operations applications 224. The vehicle operations applications 224 are implemented on one or more of the plurality of networked programmable processors 212. The vehicle operations applications 224 analyze the data model and determine desired vehicle operation. The vehicle operations applications 224 provide outputs to a critical vehicle control program 230.

Meanwhile, the end-user-driver provides input to a driver interface 250 to indicate desired vehicle operation. The end-user-driver inputs received by the driver interface 250 are provided to the vehicle operations applications 224, the data modeling program 210, and the critical vehicle control program 230.

The critical vehicle control program 230 uses the outputs from the vehicle operations programming 224 and the driver interface 250, resolves any ambiguities or conflicts, determines a single desired vehicle operation, and translates the desired operation to commands for one or more of the vehicle mechanical systems 208 to effect the single desired vehicle operation. These commands are transmitted from the critical vehicle control program 230 to operate the vehicle mechanical systems 208 via a control (or second) programming interface 258.

The critical vehicle control program 230 also includes an interface to a communications manager 260. Based upon commands from the critical vehicle control program 230, data may be transmitted to the service facility 16 (in FIG. 1) or other necessary destinations such as directly to other vehicles or to roadside equipment. The transmission of data to the service facility is subject to the priorities established between the driver assistance systems and the mobile services and information systems.

The critical vehicle control program 230 also includes an interface to a vehicle-to-user device manager 270. Based upon commands from the critical vehicle control program 230, data, such as warning or other advice, may be forwarded to the driver. This data may be forwarded to the driver from the vehicle-to-user device manager 270 via the driver interface 250. The priorities of these warnings are based upon the relative priorities established between the driver assistance systems and the mobile services and information systems.

In addition to the vehicle operations applications 224 that directly relate to the vehicle operations and safety, the in-vehicle architecture also supports another group of applications 324 that relate to mobile services and information. The mobile services and information applications 324 provide convenience, entertainment, business, comfort, and other features. In general the mobile services and information applications 324 are not as critical as the driver assistance applications 224. Thus, the mobile services and information applications 324 may be provided in general with lower priorities for the computing and communications resources of the vehicle than the driver assistance applications 224. Nonetheless, during normal operation of the vehicle, there are usually sufficient computing resources to support some or all of the mobile services and information applications 324.

The mobile services and information applications 324 receive user input from a user interface 350. The user interface 350 may include some of the same equipment and hardware as the driver interface 250. The user interface 350 may include additional interface equipment. The user interface 350 includes means by which passengers, as well as the driver, can provide input to the mobile services and information applications.

The mobile services and information applications 324 may use some of the data from the same sensors 202 and 204 used to support the driver assistance applications 224. In addition, the mobile services and information applications 324 may be supported by additional sensors 304.

In a preferred embodiment, the mobile services and information applications 324 receive input directly from the user interface 350 and the sensors 304, or alternately, the mobile services and information applications receive some of their input via one or more processing subsystem programs 310 executed on one or more of the plurality of networked processors 212. The mobile services and information applications 324 may also get information from the driver assistance systems 200.

The mobile services and information applications 324 provide outputs to a vehicle interface 330. The vehicle interface 330 resolves any conflicts among commands from the mobile services and information applications 324 and provides appropriate commands to the equipment 308 under the control of the mobile services and information applications 324. The vehicle interface 330 also includes an interface to the communications manager 260 and the drive recorder 225 and vehicle-user device manager 270.

B. THE SENSORS (DRIVER ASSISTANCE)

Figure 4:
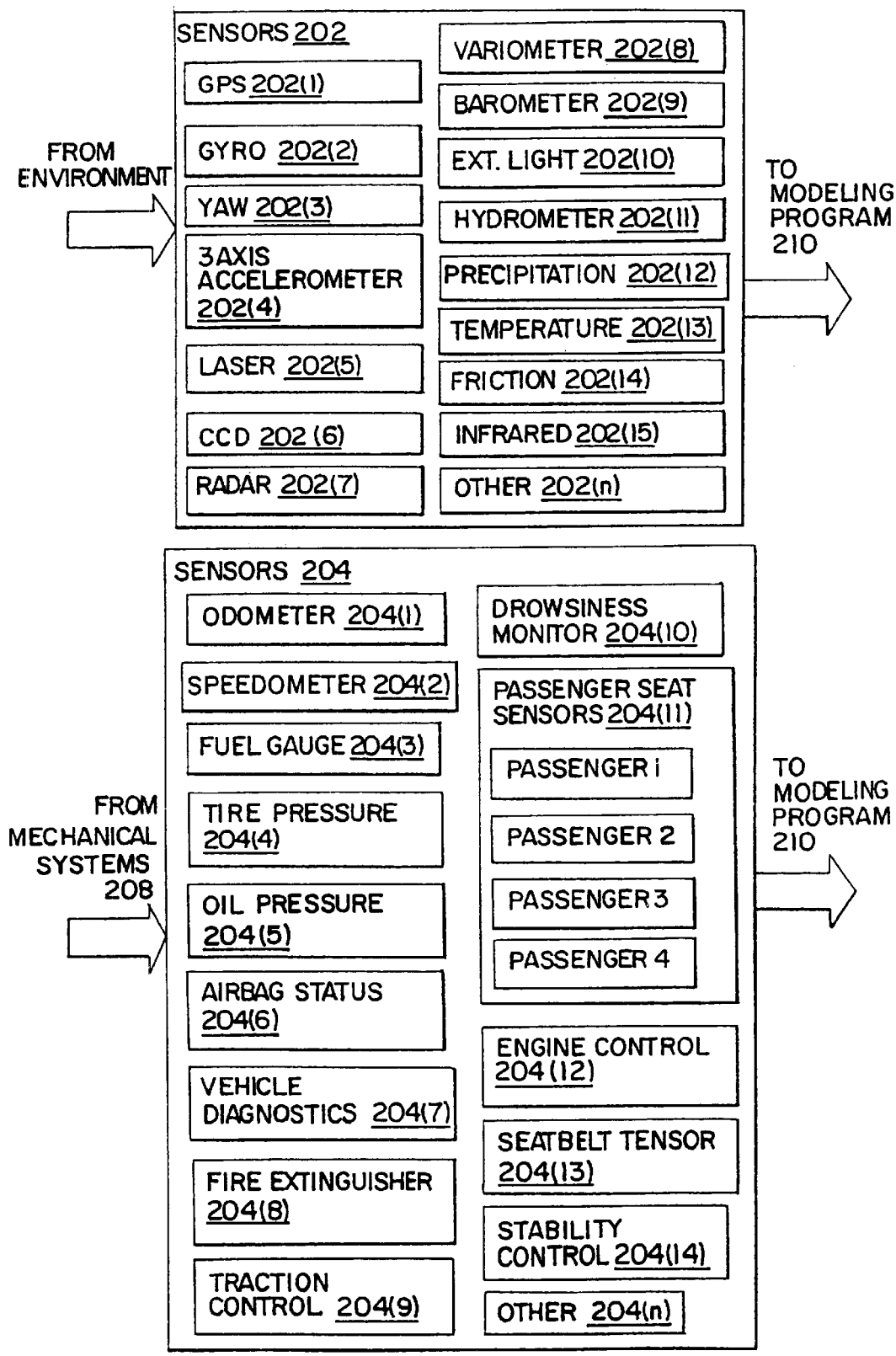
FIG. 4 is a logical block diagram illustrating the sensor devices shown in FIG. 2.

FIG. 4 shows some of the specific types of sensors included among the sensors 202 and 204 shown in FIG. 2. The first type of sensor devices 202 includes one or more different kinds of hardware or apparatuses that sense the position of the vehicle in its environment and features and conditions in the environment around the vehicle 10. Included among the sensor devices 202 are apparatuses that detect stationary or moving objects physically in the vicinity around the vehicle 10. For example, the sensor devices 202 sense and detect other vehicles, pedestrians, buildings, lampposts, bridge abutments, lane barriers, fences, traffic signals, traffic signs, and so on. The sensor devices 202 not only detect the presence of objects around the vehicle 10, but also, the sensor devices 202 detect the positions and sizes of these objects relative to the vehicle 10. Various kinds of sensor devices may be used and the present embodiment is not restricted to any particular type of sensor or combination of sensors. Examples of sensor devices that may be used to perform the desired functions include a radar system 202(7), a video camera CCD 202(6), a laser device 202(5), an infrared sensor 202(15), as well as other devices.

Also included among the sensor devices 202 are apparatuses that determine the physical position of the vehicle. The physical position of the vehicle includes its geographic position (e.g., latitude and longitude). The physical position of the vehicle also includes its orientation, altitude, inclination, and so on. The devices that perform this detection may include a global positioning system 202(1), a gyroscope 202(2), a yaw sensor 202(3), a variometer 202(8), and a 3-axis accelerometer 202(4), as well as other devices.

The sensor devices 202 also include apparatuses that sense road conditions, such as moisture and traction. The sensor devices 202 also include apparatuses that sense and detect weather and meteorological conditions, such as temperature, precipitation, barometric pressure, humidity, wind speed, ambient light, visibility, and so on. Various kinds of devices may be used and the present embodiment is not restricted to any particular type of device. Examples of such devices include a barometer 202(9), an external light sensor 202(10), a hydrometer 202(11), a precipitation sensor 202(12), a temperature sensor 202(13), a friction sensor 202(14), as well as other devices 202(n).

The second type of sensor device 204 in FIG. 2 includes one or more different kinds of hardware or apparatuses that sense various vehicle conditions. Various kinds of sensor devices may be used and the present embodiment is not restricted to any particular type of sensor. Examples of suitable devices include a vehicle odometer 204(1), a vehicle speedometer 203(2), a vehicle fuel gauge 204(3), a tire pressure sensor 204(4), an oil pressure sensor 204(5), an airbag status sensor 204(6), a fire extinguisher sensor 204(8), a traction control sensor 204(9), an engine control sensor 204(12), a stability control sensor 204(14), a seatbelt tensor sensor 204(15), a drowsiness monitor 204(10), and passenger seat sensors 204(11) that determine the presence and position of each passenger. The sensor devices 204 also include a vehicle diagnostic sensor 204(7). Other sensors in addition to these may be included and used.

C. VEHICLE-ENVIRONMENT MODELING PROGRAMMING

Figure 5:
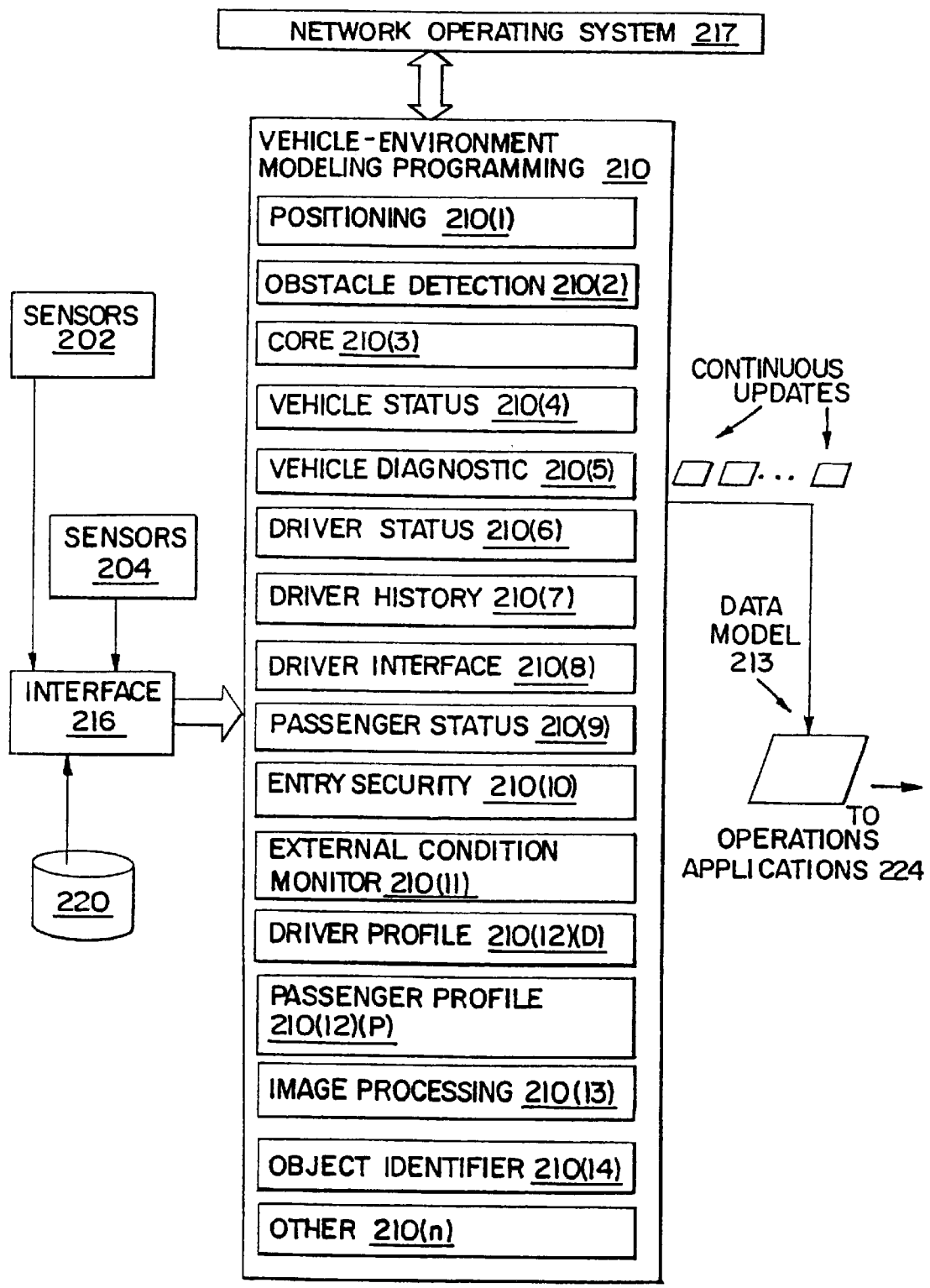
FIG. 5 is a logical block diagram illustrating some of the specific programs and Systems included in the vehicle environment modeling program shown in FIG. 5.

FIG. 5 shows some of the component programs that form the vehicle-environment modeling programming 210 shown in FIG. 3. These programs are implemented by software running on one or more of the plurality of processors 212 in FIG. 3. These component applications use the outputs from the various sensor devices 202 and 204 as well as data from the geographic database 220. In one embodiment, the outputs from various sensor devices 202 and 204 and the geographic database 220 are provided to the vehicle-environment modeling programming 210 via the common programming interface 216.

As mentioned above, the vehicle-environment modeling programming 210 provides an output in the form of the data model 213. The data model 213 is a representation (or picture) of the vehicle and the environment surrounding the vehicle. One of the properties of the data model 213 constructed by the vehicle-environment modeling programming 210 is that it is interpreted. For example, the objects in the environment surrounding the vehicle are not only detected, but an interpretation is made by the vehicle-environment modeling programming 210 as to what the detected objects are. To provide this feature, the vehicle-environment modeling programming 210 uses data from the geographic database 220 as well as data from the sensors 202 and 204 to construct the data model 213.

Another of the properties of the data model 213 is that it is a three dimensional spatial representation. The data model 213 includes representations of the objects in the environment surrounding the vehicle, including the sizes of the objects, the distances of each of the objects relative to the vehicle, the speeds and accelerations of each of the objects relative to the vehicle, and so on.

Another of the properties of the data model 213 is that it is dynamic. The data model is continuously being updated over time as the sensors acquire new data. The data model 213 is also continuously being updated spatially as the vehicle moves in the geographic area. The data model 213 is also continuously being updated as the environment around the vehicle changes, for example as other vehicles and pedestrians move in the vicinity of the vehicle.

Referring to FIG. 5, the vehicle-environment modeling programming 210 includes a vehicle positioning program 210(1). The vehicle positioning program 210(1) uses data from the sensors 202 and 204 and the geographic database 220 to determine the position, speed, and heading of the vehicle 10.

Another of the programs included in the vehicle-environment modeling programming 210 is an obstacle detection program 210(2). The obstacle detection program 210(2) determines various properties of all the obstacles detected around by the vehicle by the sensors 202. Some of the properties of the obstacles determined by the obstacle detection program 210(2) include the position, size, speed, acceleration, etc., of each detected obstacle.

The vehicle-environment modeling programming 210 also includes core programming 210(3). The core programming 210(3) uses the data from the map database 220. The map database 220 provides a highly accurate, three-dimensional representation of the roadway geometry, including features along the roadway. (In one embodiment, the map database 220 has sub-meter accuracy, although in other environments, the map database has an accuracy level that is other than sub-meter.)

The vehicle-environment modeling programming 210 also includes programming 210(4) that monitors the status of the vehicle. For example, the vehicle status programming 210(4) monitors engine speed, which gear the transmission is in, whether the headlights are on, and various other vehicle conditions.

The vehicle-environment modeling programming 210 also includes a vehicle diagnostics application 210(5). The vehicle diagnostics application 210(5) monitors the operating behavior of the vehicle hardware. Based upon this monitoring, the vehicle diagnostics application 210(5) determines whether the vehicle's operation is within normal operating parameters. The vehicle diagnostics application 210(5) may include rules and parameter data for these purposes The vehicle-environment modeling programming 210 also includes a driver status program 210(6). This program 210(6) monitors the driver's reaction times and other characteristics of the driver to determine whether the driver's behavior indicates drowsiness, intoxication, medical problems, and so on.

The vehicle-environment modeling programming 210 also includes driver history programming 210(7). This programming 210(7) logs the driver's behavior patterns over time. The driver history programming 210(7) is used in conjunction with the driver status programming 210(6) to determine when the driver's behavior while driving the vehicle deviates from normal patterns.

The vehicle-environment modeling programming 210 also includes driver interface programming 210(8). The driver interface programming 210(8) monitors and interprets control requests by the driver that are input into the driver interface 250.

The vehicle-environment modeling programming also includes programming 210(9) that monitors and determines passenger status. This programming 210(9) uses the input from the sensors 204 to determine which, if any; passenger seats are occupied, the number of passengers in the vehicle, the height and weight of each passenger, whether the passenger is occupying a baby or child seat, and other characteristics of the passengers.

The vehicle-environment modeling programming also includes entry security programming 210(10). The entry security programming 210(10) acts as an entry management system. For example, the entry security programming 210(10) may disable the engine if the wrong key is used or if the wrong electronic code key is entered.

The vehicle-environment modeling programming 210 also includes programming 210(11) that monitors the conditions external to the vehicle. This programming 210(11) monitors such conditions as temperature, humidity, wind speed, ambient light, altitude, and so on.

The vehicle-environment modeling programming 210 also includes programming 210(12)(D) that maintains a profile of the driver. This programming 210(12)(D) may maintain a listing of driver preferences, information, etc., which may be used for tailoring operation of certain of the applications, as described below. The programming 210(12)(D) stores data about the driver preferences in a driver profile data file 215(D). This data file 215(D) is stored so that it is accessible to other applications and programs in the vehicle. The driver profile data file 215(D) also may include other information about the driver, such as age, physical handicaps, if any, medical history, and so on.

The vehicle-environment modeling programming 210 may also include programming 210(12)(P) that maintains profiles of each of the passengers. This programming 210(12)(P) may include age, physical handicaps if any, medical history, and passenger preference settings, such as seat, temperature, user interface, etc. The programming 210(12)(P) stores data about the passengers in a passenger profile data file 215(P). This data file 215(P) is stored so that it is accessible to other applications and programs in the vehicle.

The vehicle-environment modeling programming 210 also includes image processing programming 210(13). The image processing programming 210(13) uses the data from the sensor devices that obtain visual images of the environment around the vehicle, such as the CCD (camera) 202(6), the radar system 202(7), the laser 202(5), and the infrared sensor 202(15). The image processing programming 210(13) analyzes the visual images received from these devices in order to identify objects in the images. The image processing programming 210(13) may use known techniques to identify objects in images. Based upon this analysis, the image processing programming 210(13) provides a list of found objects as an output that can be used by other programs and applications in the vehicle.

The vehicle-environment modeling programming 210 also includes object identifier programming 210(14). The object identifier programming 210(14) receives the list of found objects output from the image processing programming 210(13) and attempts to identify objects by type, size and speed. The object identifier programming 210(14) provides a data output to other programs and applications in the vehicle.

Figure 6:
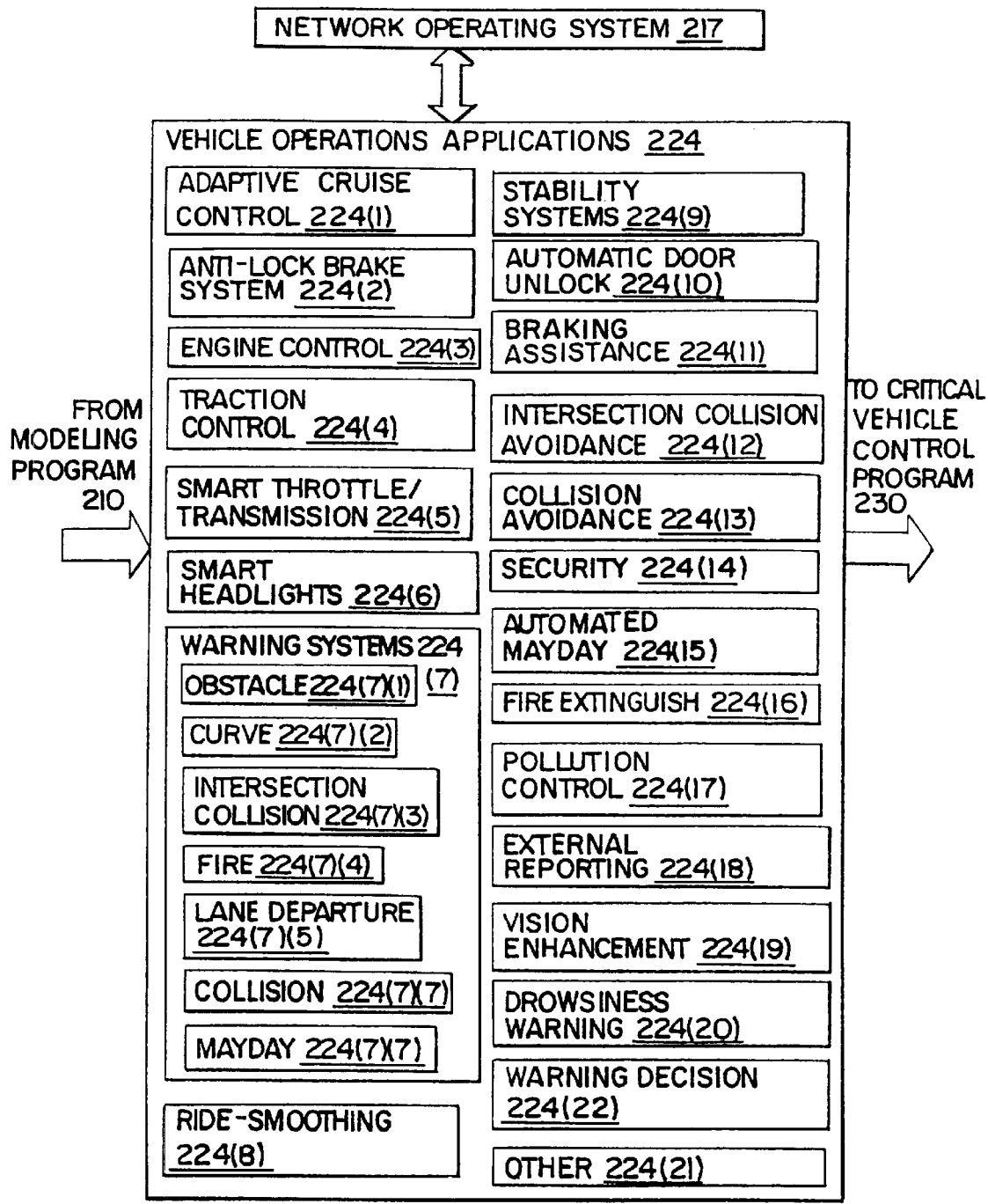
FIG. 6 is a logical block diagram illustrating some of the specific applications included among the vehicle operations applications shown in FIG. 2.

The vehicle-environment modeling programming 210 may also include other programs 210(n). D. DRIVER ASSISTANCE APPLICATIONS FIG. 6 shows some of the driver assistance applications 224 shown in FIG. 3. These applications use the data model output 213 from the vehicle-environment modeling programming 210 and the driver interface 250. The driver assistance applications 224 also use information from the driver profile data file 215(D). As mentioned above, the profile data file 215(D) stores driver preferences and desired operating characteristics. The driver assistance applications 224 provide outputs to the critical vehicle control program 230.

The driver assistance applications 224 described below are not intended to be an exhaustive listing of all the kinds of applications that can be enabled by the disclosed in-vehicle architecture. Other applications can also be provided. Similarly, not all of the driver assistance applications described below are necessarily provided in each vehicle. Various combinations of applications and various combinations of features and functions may be provided.

One of the driver assistance applications 224 that may be provided is an adaptive cruise control system and application 224(1). The adaptive cruise control system and application automatically maintains a desired following distance by managing vehicle speed as well as braking. This application is described in more detail in connection with FIGS. 9–21, below.

Another of the driver assistance applications 224 is an anti-lock brake system ("ABS") application 224(2). This application uses the information from the data model 213 relating to wheel speed, road conditions, precipitation, and desired braking to provide an output for the braking to be applied to each vehicle wheel.

The driver assistance applications 224 also include an engine control application 224(3). This application uses the information relating to vehicle status to provide an output for controlling overall engine operation, including engine speed.

The driver assistance applications 224 also include a smart throttle/transmission application 224(5). This application uses the information from the data model 213 relating to road grade, engine load, desired acceleration, and so on, to determine the appropriate transmission gear and shift points.

The driver assistance applications 224 also include a smart headlights application 224(6). This application uses information from the data model 213 relating to the vehicle environment, including other vehicles, vehicle orientation, the intended route, the road configuration along the intended route, and so on. This application provides an output that controls the headlights to better illuminate around and ahead of the vehicle. The output of the smart headlights application 224(6) is used to automatically aim the headlights around curves ahead of the vehicle. The output of the smart headlights application 224(6) may also be used to automatically aim the headlights upward as hills are approached. The smart headlights application 224(6) may also be used to automatically adjust the high beams, automatically turn on and off the headlights, automatically turn on the driving lights and fog lights, automatically turn on directional signals, and so on.

The driver assistance applications 224 also include a traction control application 224(4). This application uses the information from the data model 213 relating to vehicle speed, engine speed, road conditions, and desired operation to provide outputs for the torque to be applied to each wheel.

The driver assistance applications 224 also includes warning system applications 224(7). The warning system applications 224(7) may include an obstacle warning application 224(7)(1), a curve warning application 224(7)(2), an intersection collision warning application 224(7)(3), a fire warning application 224(3)(4), a lane departure warning application 224(7)(5), a collision warning application 224(7)(6), and a mayday warning application 224(7)(7). The obstacle warning application 224(7)(1) uses the information from the data model 213 relating to the speed and direction of the vehicle and the speeds and directions of the obstacles around the vehicle. This application provides an output to warn the driver of these obstacles. The curve warning application 224(7)(2) uses the information from the data model 213 about curves in the road ahead of the vehicle, the road conditions, the weather conditions, the ambient light, and the vehicle's position and speed relative to curves in the road ahead. The curve warning application 224(7)(2) provides an output to give the driver with a warming, if appropriate. As the vehicle approaches an intersection, the intersection collision warning application 224(7)(3) uses the information from the data model 213 about the speed and direction of the vehicle and the speeds and directions of the other vehicles around the intersection to provide a warning of possible collisions with other vehicles. The fire warning application 224(7)(4) uses the information from the data model 213 relating to vehicle status and diagnostics to provide an output to warn about a detected fire in the vehicle. The lane departure warning application 224(7)(5) uses the information from the data model relating to the vehicle's coordinates and the lane coordinates to provide an output warning of possible departure by the vehicle from the lane. The collision warning application 224(7)(6) uses the information from the data model relating to the vehicle's coordinates and coordinates of other objects around the vehicle to provide an output warning of possible collision with other objects. The mayday warning application 224(7)(7) provides a warning informing the driver when the automatic mayday application 224(5) has been activated to send a warning.

The driver assistance applications 224 also include a ride-smoothing application 224(8). This application uses the information from the data model 213 relating to road conditions and vehicle speed to provide outputs to adjust the vehicle suspension characteristics.

The driver assistance applications 224 also include a stability application 224(9). This application uses information from the data model 213 relating to vehicle status and vehicle environment. This application provides an output to adjust vehicle operation to prevent overturning.

The driver assistance applications 224 also include an automatic door unlock application 224(10). This application uses the information from the data model relating to vehicle status, driver status, and passenger status to automatically lock the vehicle doors when a collision is imminent and then automatically unlock the vehicle doors when the vehicle has safely come to a stop after a collision. This application may also lock all the vehicle doors when the driver and passengers are all inside the vehicle and the vehicle is ready to move.

The driver assistance applications 224 also include a braking assistance application 224(11). This application uses information from the data model 213 relating to vehicle status and vehicle environment. This application provides an output to assist the function of the vehicle brakes.

The driver assistance applications 224 also include an intersection collision avoidance application 224(12). As the vehicle approaches an intersection, this application 224(12) uses information about the road configuration to automatically command the vehicle to avoid a collision at an intersection that the vehicle is approaching. This application uses information from the data model 213 relating to the vehicle position and direction, as well as data relating to the road configuration. The road configuration information can be used to provide this function even at intersections that may not be visible to the driver. The road condition information is also used by this application to determine a safe collision avoidance maneuver (i.e., so that a maneuver that avoids one object does not hit another object). This application may also use information about the positions and planned routes of the other vehicles that are approaching an intersection ahead of the vehicle. Using this information, the application also determines maneuvers that avoid collisions with other vehicles that are also approaching the intersection. The information relating to the planned routes of the other vehicles may be obtained from the service provider 16 or directly from the other vehicles.

The driver assistance applications 224 also include a collision avoidance application 224(13). This application uses information about the road configuration, road furniture, and about obstacles detected around the vehicle and provides an output that can be used to automatically command the vehicle to avoid obstacles.

The driver assistance applications 224 also include a security application 224(14). This application uses the information from the data model 213 relating to the vehicle status, driver status, and passenger status. This application uses this information to prevent unauthorized use of the vehicle, to provide outputs to request assistance in the event of unauthorized use of the vehicle, and so on.

The driver assistance applications 224 also include an automated mayday application 224(15). This application uses the information from the data model 213 relating to vehicle and driver condition to provide an output to the communications manager 260 to request emergency assistance. This application is described in more detail in connection with FIGS. 22–25, below.

The driver assistance applications 224 also include a fire extinguisher application 224(16). This application uses information from the data model 213 relating to vehicle status and environmental conditions. This application provides an output to operate a fire extinguisher system under appropriate conditions.

The driver assistance applications 224 also include a pollution control application 224(17). This application uses information from the data model 213 relating to vehicle status and vehicle environment. This application provides output commands to the vehicle hardware systems to minimize pollution under various driving conditions. For example, using information about the altitude, barometric pressure, wind speed, ambient light conditions, and temperature, the pollution control application 224(17) modifies engine operation to minimize pollution.

The driver assistance applications 224 also include an external reporting application 224(18). This application uses information from the data model 213 relating to the vehicle status and vehicle environment. This application provides an output to report on certain vehicle and/or environment conditions. For example, if the sensors detect ice or snow on the road, the external reporting application 224(18) reports information about the amounts and locations of the ice or snow to the service provider 16, which in turn may send messages to other vehicles travelling along the road so that the other vehicles can adjust their operation to account for the ice or snow.

The driver assistance applications 224 also include a vision enhancement application 224(19). This application uses information from the data model 213 relating to vehicle status and vehicle environment. This application provides an output to provide additional information to the driver about conditions around the vehicle. For example, the vision enhancement application 224(19) uses information from the sensors, such as the radar 202(7), to display objects around the vehicle to the driver when the visibility around the vehicle is poor.

The driver assistance applications 224 also include a drowsiness warning application 224(20). This application uses information from the data model 213 relating to driver status, vehicle status, and driver history. This application provides an output to warn the driver in the event driver behavior indicates that the driver is drowsy.

The driver assistance applications 224 also include a warning decision application 224(22). This application uses information from the warning applications 224(7), the vehicle status, and the driver status to determine whether to provide the driver with a warning message, to coordinate provision of multiple warning messages, and to forward information about warnings to the communication manager 260 for relay to the service provider 16, when appropriate. This application is described in more detail in connection with FIG. 20, below.

The driver assistance applications 224 may include additional programs 224(n). Also, additional programs may be added as upgrades, updates, or entirely new applications. Because the applications 224 operate from the data model 213 and not directly from the sensors 202 and 204, new applications may be added by means of a software upgrade.

E. VEHICLE HARDWARE SYSTEMS

FIG. 2 shows that the vehicle 10 includes various hardware systems 208. These hardware systems 208 include the various mechanical, hydraulic, and electrical systems that move and stop the vehicle and provide for driver and passenger safety. These mechanical, hydraulic, and electrical systems 208 operate under the control of actuators or other controller devices. The actuators and controller devices receive commands from the critical vehicle control program 230 through the command programming interface 258.

Figure 7:
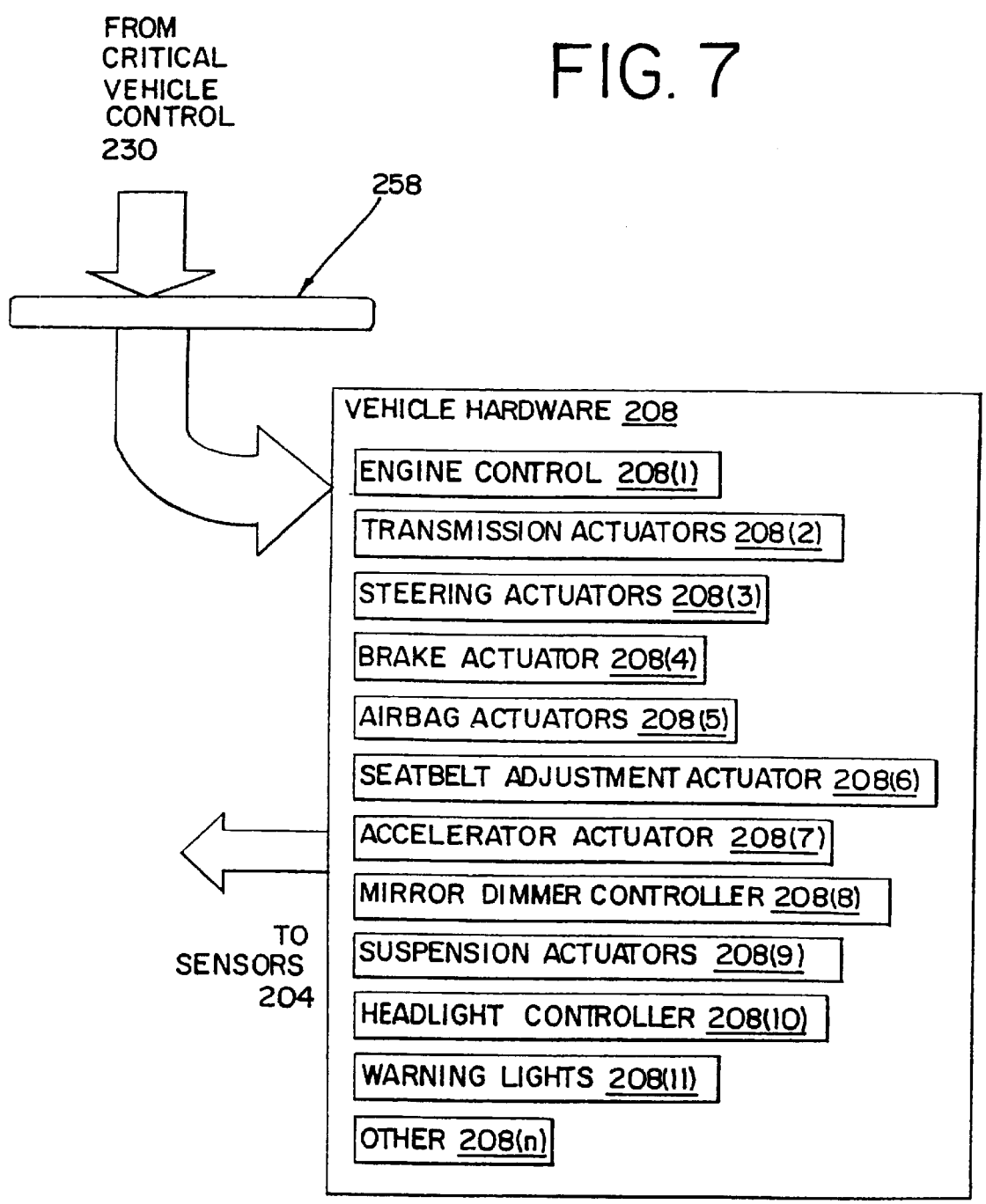
FIG. 7 is a logical block diagram illustrating the vehicle mechanical systems controlled by the critical vehicle control programming shown in FIG. 2.

Some of the vehicle hardware systems 208 according to one embodiment are shown in FIG. 7. Vehicle embodiments may include hardware systems in addition to those shown in FIG. 7 and likewise there may be vehicle embodiments that do not include all the hardware systems shown in FIG. 7. As shown in FIG. 7, these hardware systems 208 are operated by commands from the critical vehicle control program 230. Included among these systems are an engine control system 208(1), a transmission actuator 208(2), steering actuators 208(3), brake actuators 20(4), airbag actuators 208(5), seatbelt adjustment actuators 208(6), an accelerator actuator 208(7), a mirror dimmer controller 208(8), suspension actuators 208(9), a headlight controller 208(10), and warning light actuators 208(11). Other mechanical, hydraulic, and electrical systems 208(n) may be operated via commands from the critical vehicle control program 230.

F. MOBILE SERVICES AND INFORMATION

Figure 8:
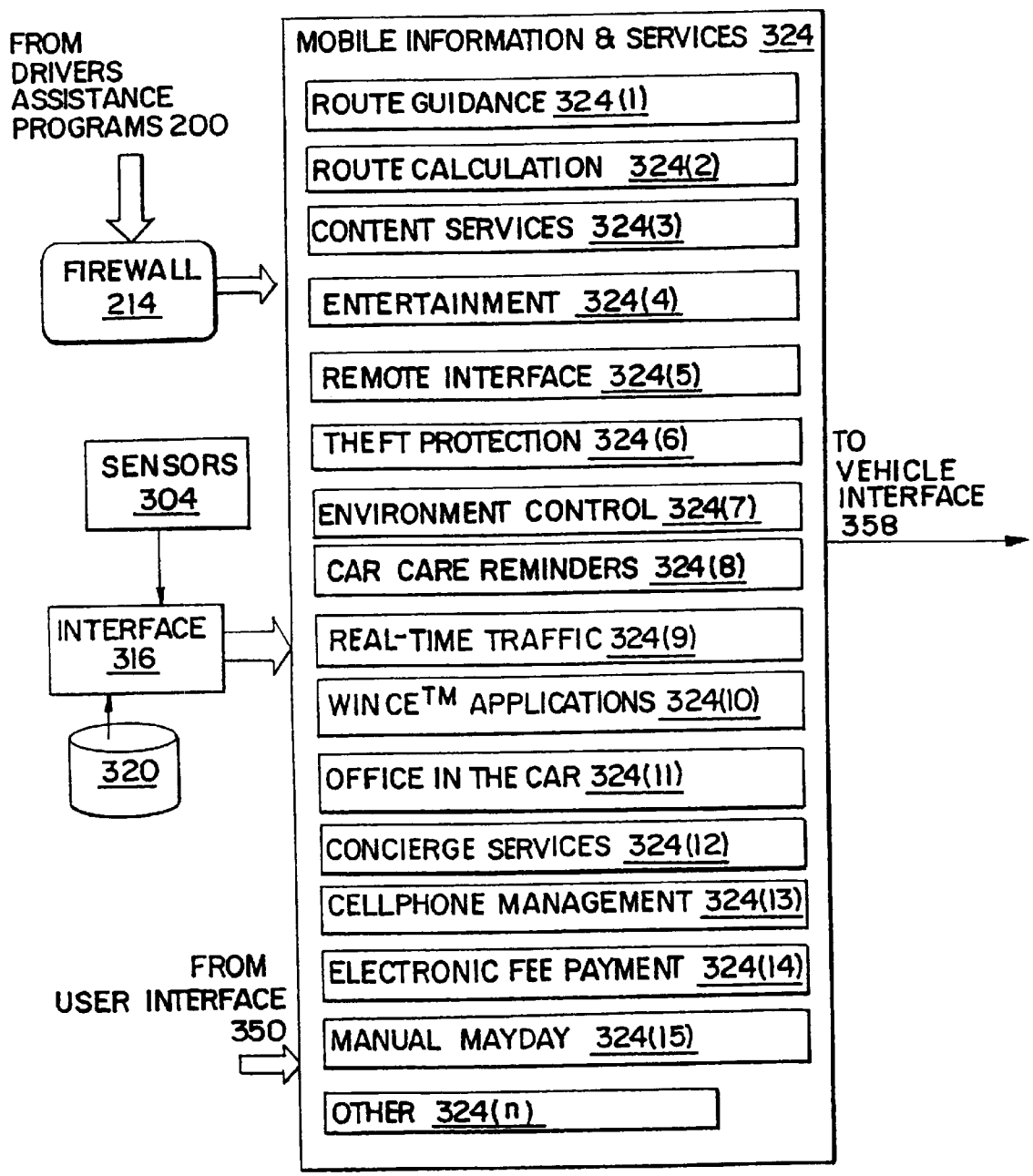
FIG. 8 is a logical block diagram illustrating some of the specific applications included among the mobile services and information applications shown in FIG. 3.

FIG. 8 shows some of the specific mobile services and information applications 324 that are indicated in FIG. 3. These applications 324 may be provided entirely on-board the vehicle, entirely off-board the vehicle, or may be hybrid applications that are provided in part on-board and in part off-board the vehicle.

In FIG. 8, the mobile services and information applications 324 are shown to receive data from the vehicle sensors 304 and the mobile services and information geographic database 320. The geographic database 320 used by the mobile services and information programming may be the same as the geographic database (i.e., 220 in FIG. 2) used by the driver assistance programs 210 and 224. Alternatively, the mobile services and information programming and the driver assistance programming may use different databases. The geographic database 320 used by the mobile services and information programming includes information that can be used to calculate routes, provide route guidance, find desired destinations, find desired points of interest, and provide other services. The geographic database 220 used by the driver assistance programming is used to build a detailed three-dimensional model of the environment around the vehicle. Although separate databases may be used, information about the planned route of the vehicle is used when forming a three-dimensional model in order to determine what part of the environment around the vehicle is ahead. The mobile services and information applications 324 also receive input from the user interface 350. The mobile services and information applications 324 also receive data from the driver assistance systems 200 across the firewall 214.

FIG. 8 shows the mobile services and information applications and systems in one exemplary vehicle embodiment. Other embodiments may include applications and systems in addition to those shown in FIG. 8. Also, some embodiments may not include all the applications and systems shown in FIG. 8 or may include different combinations of applications and systems.

The mobile services and information applications 324 may include route guidance 324(1), route calculation 324(2), content services 324(3), entertainment 324(4), a remote interface 324(5), theft protection services 324(6), office-in-the-car services 324(11), car environment controls 324(7), car care reminders 324(8), Win CE™ applications 324(10) (or other visiting operating systems applications), real-time traffic services 324(9), concierge services 324(12), electronic fee payment 324(14), cellphone management 324(13), and a manual mayday application 324(15), as well as other services 324(n). These services and applications provide outputs to the vehicle interface 358 (shown in FIG. 3).

Examples of services or systems that provide some of the features of the mobile services applications or similar features include AutoPC™, MONET™, Tegaron Info™, SmarTraveler™, and OnStar™.

III. Component Applications

A. Adaptive Cruise Control (1). Overview

One of the applications that can be implemented using the disclosed vehicle computing architecture is an adaptive cruise control system. The hardware and connectivity needs of the adaptive cruise control system are supported by the physical portion of the in-vehicle computing architecture platform.

The adaptive cruise control feature automatically adjusts the speed and direction of the vehicle to provide for proper intervals between the vehicle and other vehicles and obstacles. This feature is provided by a combination of components, including software and hardware components in the mobile information and services portion of the in-vehicle computing architecture as well as software and hardware components in the driver assistance portion. The adaptive cruise control feature is described in connection with FIGS. 9–21.

Figure 9:
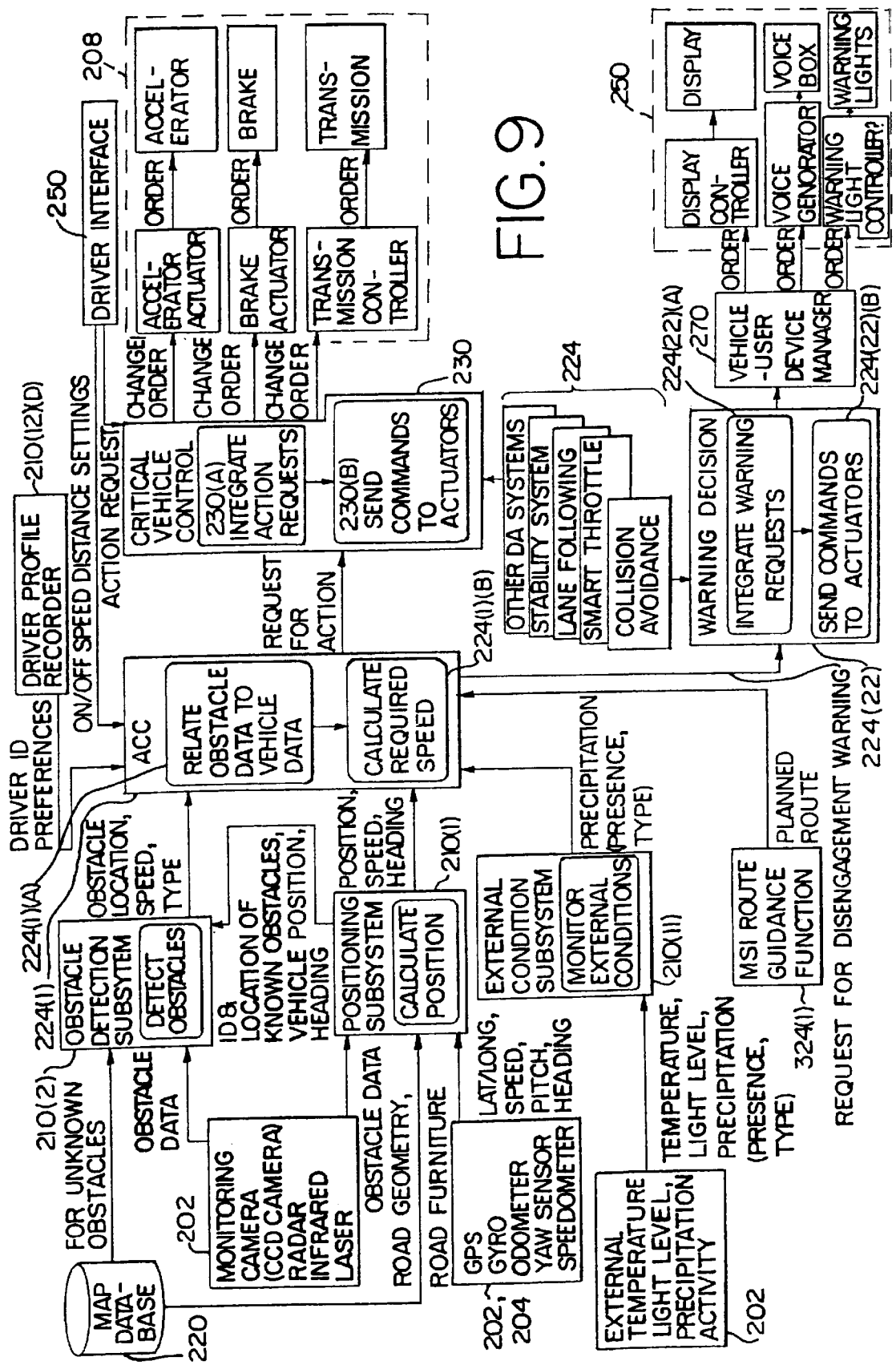
FIG. 9 is a logical data flow diagram illustrating the components that form the adaptive cruise control application shown in FIG. 6.
Figure 10:
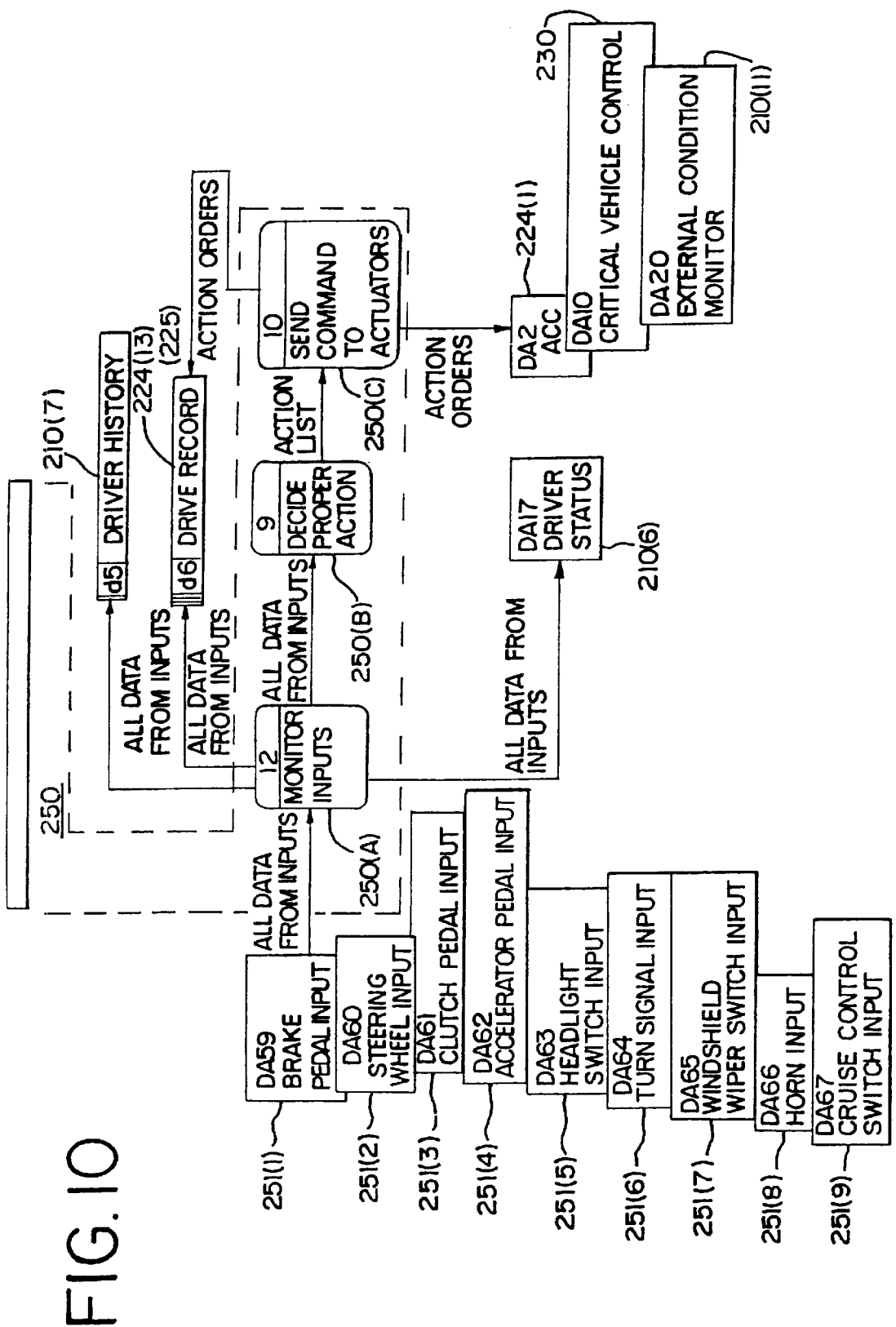
FIG. 10 is a logical data flow diagram illustrating components of the driver interface system shown in FIG. 9.

Referring first to FIG. 9, there is shown a logical block diagram showing the major components that implement the adaptive cruise control feature. In FIG. 9, the adaptive cruise control application 224(1) receives data from and outputs data to other systems, programs and applications included in the in-vehicle computing architecture. These other systems, programs and applications are described in the sections that follow.

(2). Driver Interface

Included among the components from which the adaptive cruise control application 224(1) receives data is the driver interface system 250. The driver interface system 250 is shown in more detail in FIG. 10. The driver interface system 250 includes a monitoring process 250(A). The monitoring process 250(A) monitors inputs from various driver interface hardware components. The inputs that the process 250(A) monitors may include input from the brake pedal 251(1), input from the steering wheel 251(2), input from the clutch pedal 251(3), input from the accelerator 251(4), input from the headlights switch 251(5), input. from the turn signal handle 251(6), input from the windshield wiper switch 251(7), input from the horn 251(8), input from the cruise control switch 251(9), and well as from other driver interface hardware components. The monitoring process 250(A) collects the data from these various inputs and provides an output to the driver history program 210(7) and the drive recorder 225. The driver history program 210(7) and the drive recorder 255 use the data from the monitoring process 250(A) to store respective records in memories in the vehicle. The monitoring process 250(A) also provides an output to the driver status program 210(6). The monitoring process 250(A) also outputs the data collected from the various driver interface components to a decision process 250(B). These outputs provided to the decision process 250(B) represent physical manipulations by the driver of the driver interface components. The decision process 250(B) receives each of these outputs from the monitoring process 250(A) and provides a translation into data indicating a desired vehicle operation. For example, a signal from a sensor associated with the brakes indicates the force applied by the driver to the brake pedal (or other brake component). This signal is collected by the monitoring process 250(A) and provided to the decision process 250(B) that provides an output indicative of a desired force to be applied by the brakes.

The decision process 250(B) provides an output to a send command process 250(C). In turn, the send command process 250(C) provides data outputs to the adaptive cruise control application 224(1). Specifically, the driver interface system 250 provides data to the adaptive cruise control application 224(1) indicating whether the driver has turned on or off the adaptive cruise control feature. Additionally, the driver interface 250 may also provide data to the adaptive cruise control application 224(1) indicating distance settings desired by the driver which will be used instead of default settings. The driver interface system 250 also provides data to other components and systems in the in-vehicle computing architecture, including the critical vehicle control program 230 and the external condition monitor program 210(11), among others.

(The driver interface 250 may also include a display controller 251(10), a heads-up controller 251(11), a voice generator 251(12), and a warning light actuator 251(13). These components are described below in connection with the vehicle-user device manager 270.)

(3). Driver Profile Recorder

Figure 11:
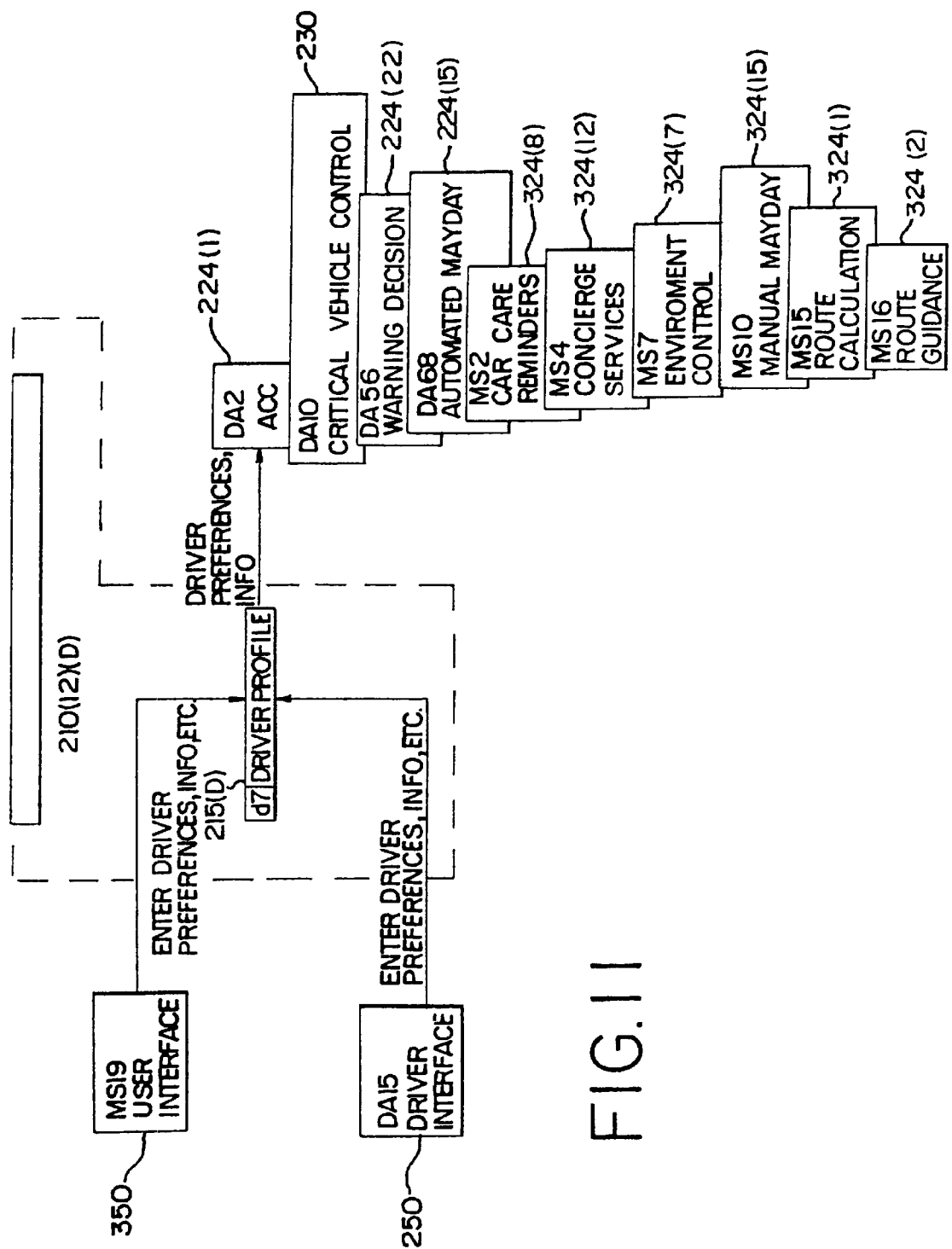
FIG. 11 is a logical data flow diagram illustrating the component processes that form the driver profile recorder shown in FIG. 9.

Referring again to FIG. 9, another of the programs from which the adaptive cruise control application 224(1) receives data is the driver profile recorder program 210(12) (D). FIG. 11 shows the component that forms the driver profile recorder program 210(12)(D). The driver profile data file 215(D) receives driver preferences, information, etc., from the driver interface 250. The information in the driver profile data file 215(D) is made available to the other applications, components, and systems. These other applications, components, and systems include the adaptive cruise control application 224(1), the critical vehicle control system 230, the warning decision application 224(22), the automatic mayday application 224(15), the car care reminders application 324(8), the concierge services application 324(12), the environment control application 324(7), the manual mayday application 324(15), the route calculation application 324(1), and the route guidance application 324 (2). Specifically, the adaptive cruise control application 224(1) obtains data from the driver profile data file 215(D) indicating the identity of the driver as well as the driver's preferences, such as speed, driving intervals, preferred types and timing of warnings, etc.

(4). Positioning System

Figure 12:
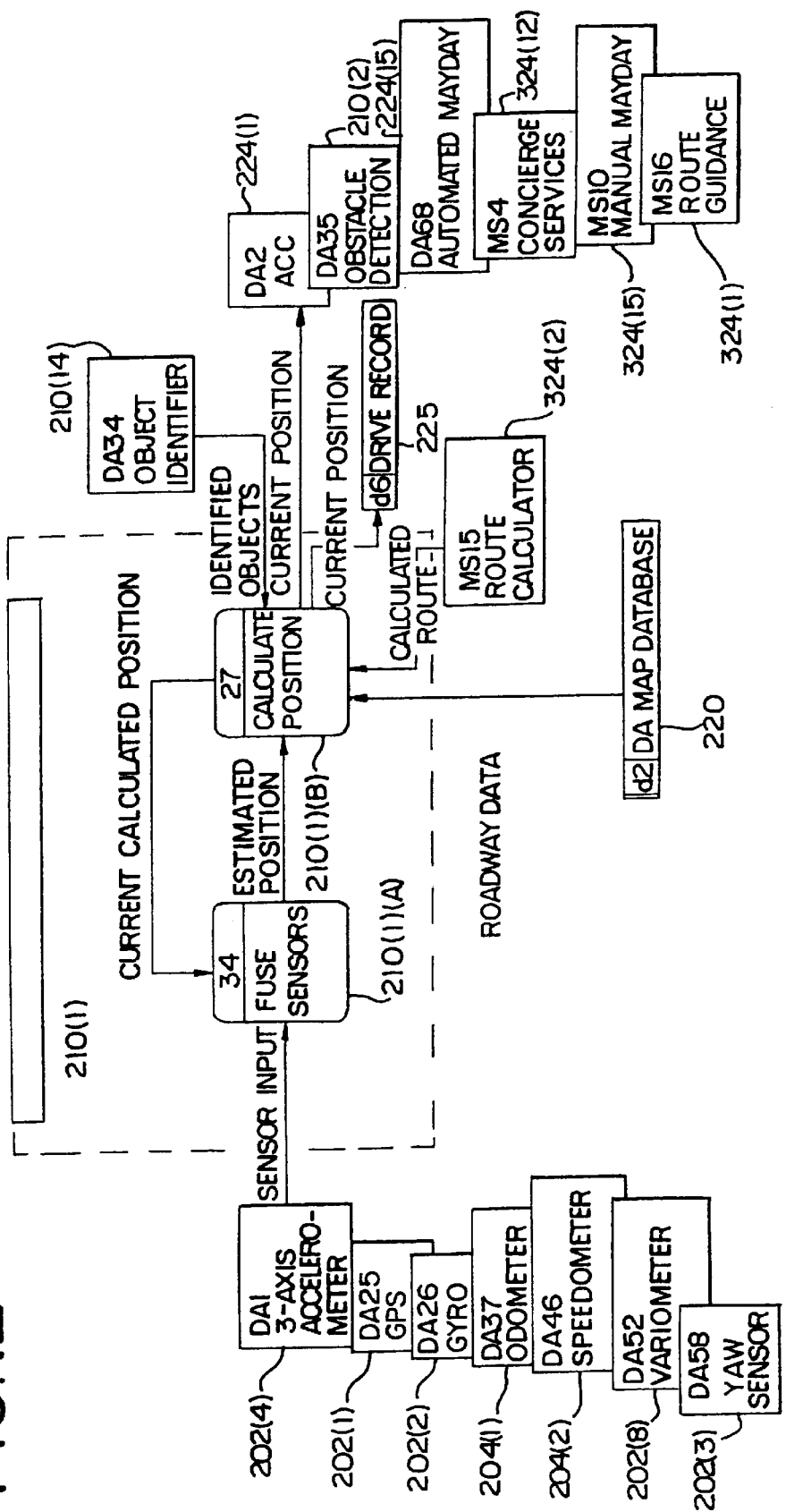
FIG. 12 is a logical data flow diagram illustrating the component processes that form the positioning program shown in FIG. 9.

Referring again to FIG. 9, another of the components from which the adaptive cruise control application 224(1) receives data is the positioning program 210(1). The positioning program 210(1) is part of a vehicle positioning system that includes software and hardware components. FIG. 12 shows the component processes included in the positioning program 210(1). In FIG. 12, the positioning program 210(1) includes a process 210(1)(A) that fuses data from sensors. The process 210(1)(A) receives data from sensors, such as the GPS 202(1), the gyroscope 202(2), the yaw sensor 202(3), the speedometer 204(2), the odometer 204(1), the variometer 202(8), and the 3-axis accelerometer 202(4). The process 210(1)(A) then fuses the data and provides a fused collection of the data to a position calculation process 210(1)(B). The position calculating process 210(1)(B) receives the fused collection of data from the fusing process 210(1)(A). The position calculating process 210(1)(B) also receives data from the map database 220. The position calculating process 210(1)(B) may also receive from the object identifier application 210(14) data indicating objects identified around the vehicle. The position calculating process 210(1)(B) may also receive from the route calculation application 324(2) data indicating the calculated route that the vehicle is following.

The position calculating process 210(1)(B) calculates the position, speed, and heading of the vehicle 10.using data from the fusing process 210(1)(A), the map database 220, the object identifier application 210(14), and the route calculation application 324(2). The position calculating process 210(1)(B) provides data to the adaptive cruise control application 224(1) indicating the position, speed, and heading of the vehicle 10. The position calculating process 210(1)(B) also feeds back the current calculated position to the fusing process 210(1)(A) which uses the current calculated position in connection with a subsequent iteration of the fusion process. The position calculating process 210(1) (B) also provides data indicating the position, speed, and/or heading of the vehicle 10 to other applications, such as the obstacle detection application 210(2), the automated mayday application 224(15), the concierge services application 324(12), the manual mayday application 324(15), the route guidance application 324(1), and the drive recorder 225.

(5). External Condition Monitor

Figure 13:
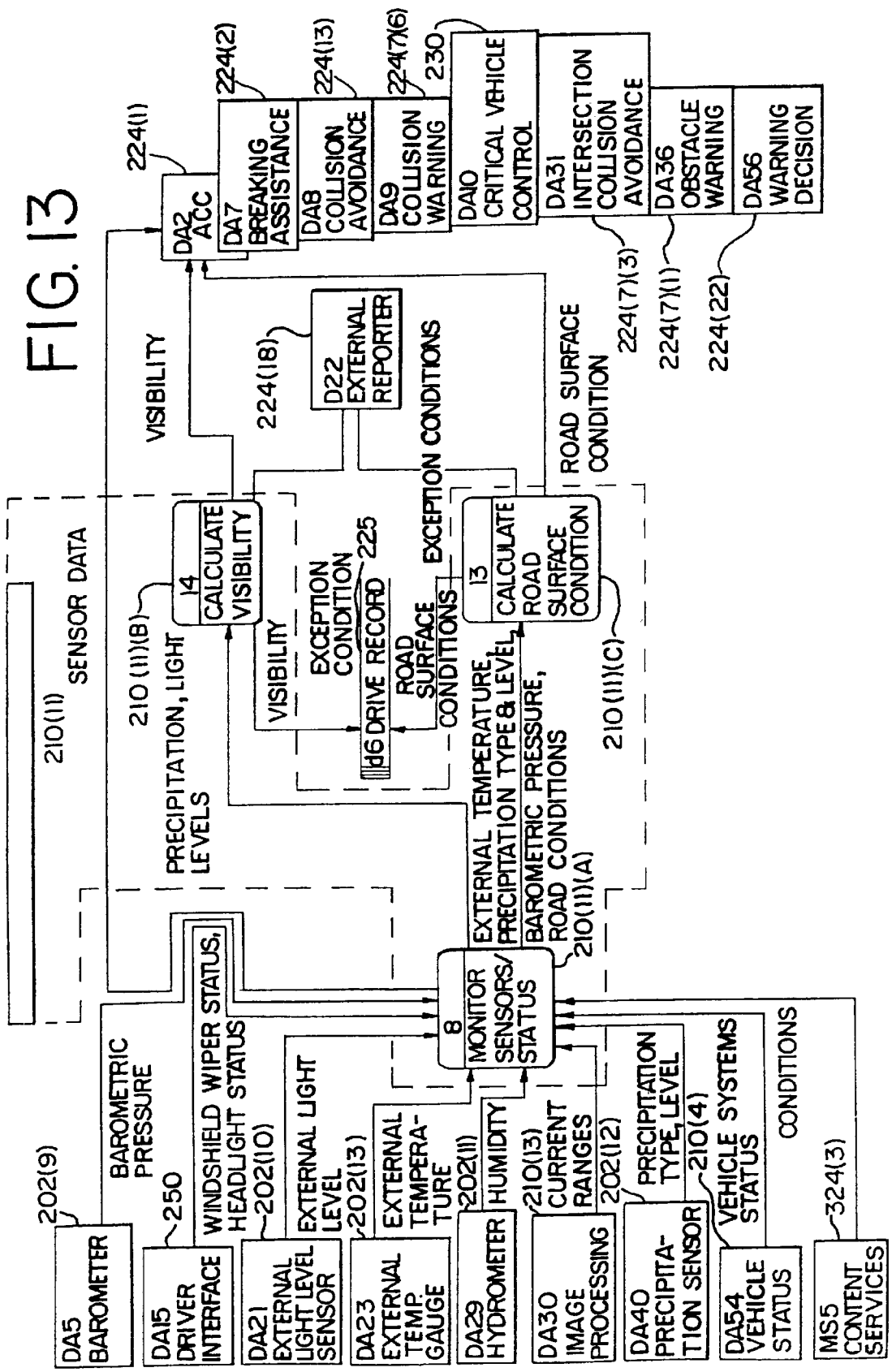
FIG. 13 is a logical data flow diagram illustrating the component processes that form the external condition monitoring program shown in FIG. 9.

Referring again to FIG. 9, another of the programs from which the adaptive cruise control application 224(1) receives data is the external condition monitor program 210(11). FIG. 13 shows the component processes that form the external condition monitor program 210(11). In FIG. 13, the external condition monitor program 210(11) includes a monitoring process 210(11)(A). The monitoring process 210(11)(A) receives barometric data from the barometer 202(9), data indicating the status of the windshield wipers and headlights from the driver interface 250, data indicating the external light level from the external light sensor 202 (10), data indicating the external temperature from the external temperature gauge 202(13), data indicating the humidity from the hydrometer 202(11), data indicating the current visibility ranges from the image processing program 210(13), data indicating the precipitation type and level from the precipitation monitor 202(12), data indicating the vehicle status from the vehicle status program 210(4), and data, such as road condition warnings, from the content services 324(3). It is noted that in one embodiment, the sensor data received by the monitoring process 210(11)(A) may also be used by other applications in the vehicle that need such data. It is also noted that uncorrelated sensor information can be made available to any and all applications as they need it. There may be cases when an application only needs a certain piece of sensor data and does not required the correlated version. Both the correlated and uncorrelated data are used when forming the data model.

The monitoring process 210(11)(A) may provide some or all of the data it receives to other in-vehicle applications, including the adaptive cruise control application 224(1), the braking assistance application 224(11), the collision avoidance application 224(13), the collision warning application 224(7)(6), the critical vehicle control program 230, the intersection collision avoidance application 224(7)(3), the obstacle warning application 224(7)(1), and the warning decision application 224(22).

(This monitoring process 210(11)(A) also monitors the operational status of each of the sensor components 202, 204, and 304 that provides data to it.) The monitoring process 210(11)(A) provides the data relating to visibility, such as precipitation and light levels, to a visibility calculation process 210(11)(B). The process 210(11)(B) calculates the visibility and provides output data indicating the visibility to the adaptive cruise control application 224(1), the braking assistance application 224(11), the collision avoidance application 224(13), the collision warning application 224(7)(6), the critical vehicle control program 230, the intersection collision avoidance application 224(7)(3), the obstacle warning application 224(7)(1), and the warning decision application 224(22). The visibility calculating process 210(11)(B) also provides the data indicating the visibility to the drive recorder 225. If the visibility data represents an exception (i.e., from normal visibility conditions and/or from a previously reported abnormal visibility conditions), the visibility calculating process 210(11)(B) also provides the data indicating the visibility to the external reporting application 224(18) so that it can be transmitted to the service facility 16 and relayed to other vehicles.

The monitoring process 210(11)(A) also provides the data relating to road surface conditions, such as external temperature, precipitation type and level, and barometric pressure to a process 210(11)(C) that calculates a road surface conditions parameter. This road surface condition calculating process 210(11)(C) provides output data indicating the road surface condition parameter to the adaptive cruise control application 224(1), the braking assistance application 224(11), the collision avoidance application 224(13), the collision warning application 224(7)(6), the critical vehicle control program 230, the intersection collision avoidance application 224(7)(3), the obstacle warning application 224(7)(1), and the warning decision application 224(22). The process 210(11)(C) also provides the data indicating the road surface conditions to the drive recorder 225. If the road surface condition data represents an exception (i.e., from normal road surface conditions and/or from previously reported abnormal road surface conditions), the road surface condition calculating process 210(11)(C) also provides the data indicating the road surface conditions to the external reporting application 224(18) so that it can be transmitted to the service facility 16 and relayed to other vehicles.

(6). Rouie Calculation and Route Guidance Applications

Figure 14:
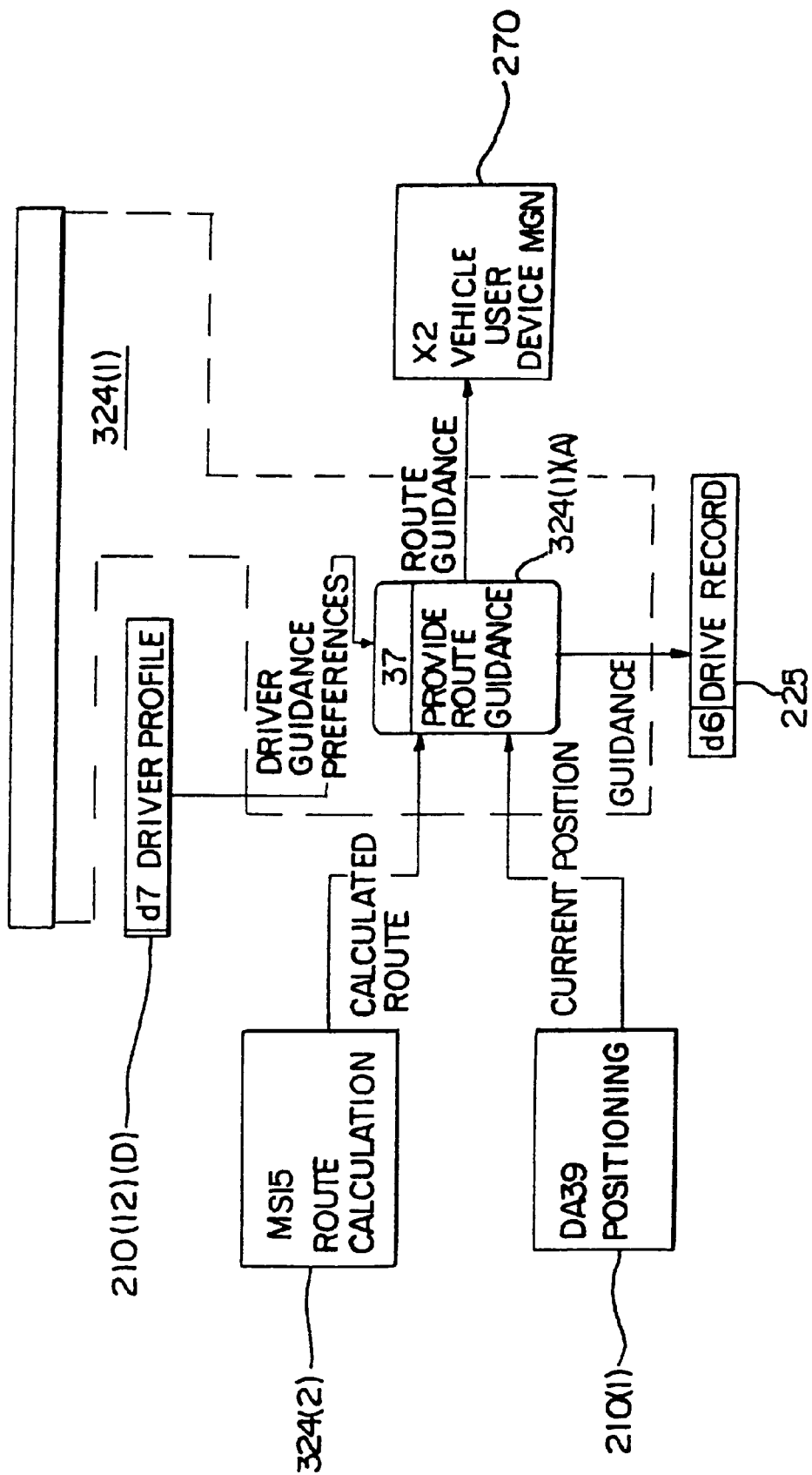
FIG. 14 is a logical data flow diagram illustrating the component processes that form the route guidance application shown in FIG. 9.

Referring again to FIG. 9, another of the applications from which the adaptive cruise control application 224(1) receives data is the route guidance application 324(1). The route guidance application 324(1) operates in conjunction with the route calculation application 324(2). FIG. 14 shows the component processes that form the route guidance application 324(1) and FIG. 15 shows the component processes that form the route calculation application 324(2).

Figure 15:
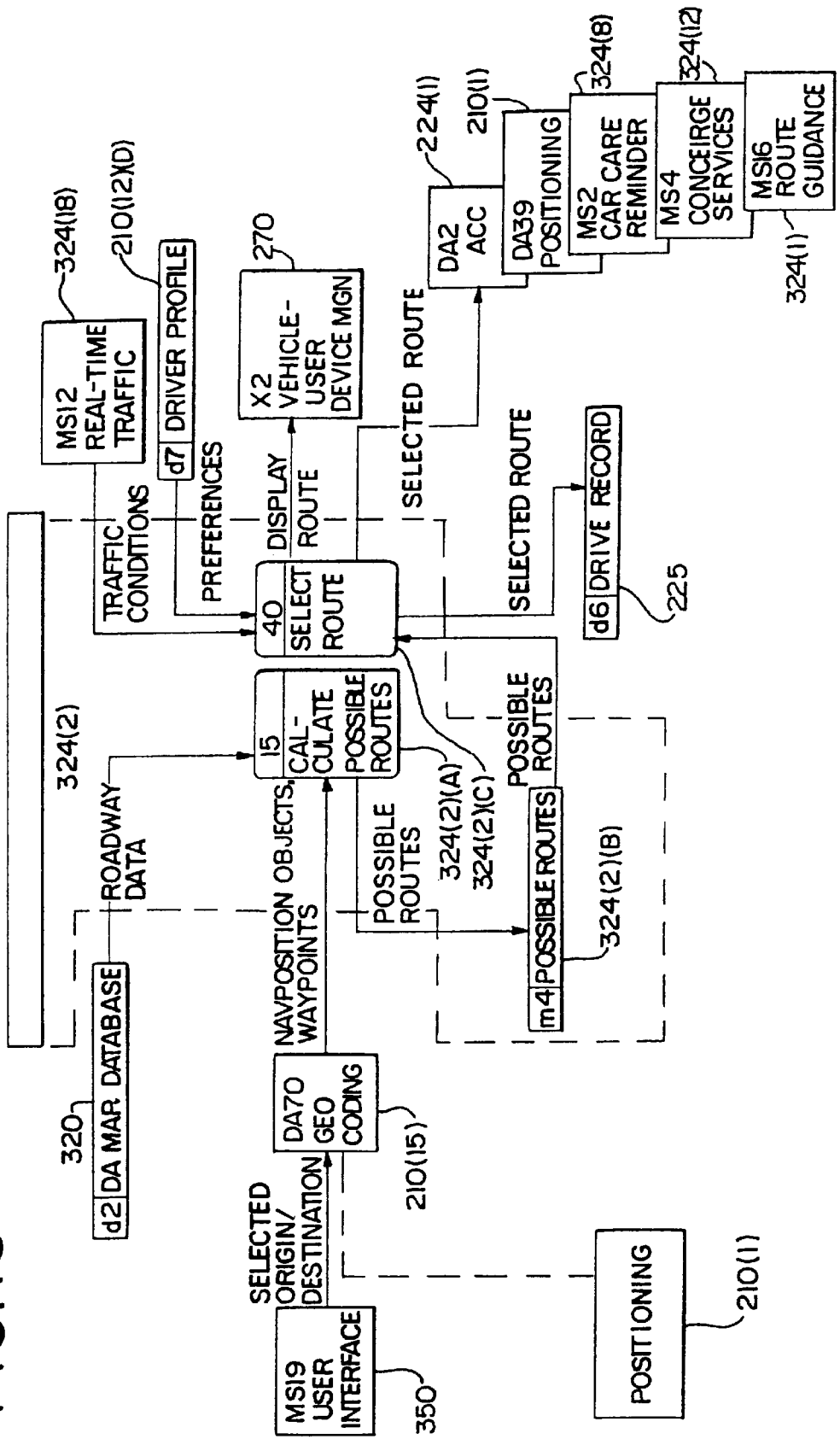
FIG. 15 is a logical data flow diagram illustrating the component processes that form the route calculation application shown in FIG. 14.

Referring first to FIG. 15, the user (who may be the driver) selects a desired destination location using the user interface 350. Optionally, the user may also select an origin location using the user interface 350, or alternatively, the current position of the vehicle may be specified as the origin location by default. Data indicating the desired destination location and the origin location are provided to a geocoding process 210(15). (If the current position of the vehicle is taken to be the origin, data indicating the current position of the vehicle is provided to the geocoding program 210(15) from the positioning program 210(1).) The geocoding program 210(15) determines the positions of the origin location and destination location relative to the data in the geographic database 320. The geocoding program 210(5) provides a data output indicating the positions of the origin location and destination location relative to the geographic database 320 to a route calculation process 324(A) which is part of the route calculation application 324(2). (The geocoding process 210(15) may also be part of the route calculation application 324(2) or may be a standalone process.) Using data from the geographic database 320, the route calculation process 324(2)(A) calculates one or more possible routes. The route calculation process 324(2)(A) provides a data output that defines the one or more possible calculated routes. The data output from the route calculation process 324(2)(A) is provided to a data storage 324(2)(B).

A route selection process 324(2)(B) receives the data that defines the one or more calculated routes. The selection process 324(2)(B) may also receive data that indicates current traffic conditions from the real-time traffic application 324(9). The selection process 324(2)(B) also receives data that indicates the driver's preferences from the driver profile program 210(12)(D). Using all these inputs, the route selection process 324(2)(B) selects one of the calculated routes. The route selection process 324(2)(B) provides a data output that defines the selected calculated route to the drive recorder 225. The data that defines the selected calculated route is also provided by the route selection process 324(2)(B) to the adaptive cruise control application 224(1), the positioning system 210(1), the car care reminder application 324(8), the concierge services application 324(12), and the route guidance application 324(1). The route selection process 324(2)(B) also provides data to the vehicle-user device manager 270 that enables the selected calculated route to be displayed to the driver via the user interface 350. FIG. 14 shows the processes related to the route guidance application 324(1). The route guidance application 324(1) includes a process 324(1)(A) that receives the data defining the selected route from the route calculation application 324(2) (in FIG. 15). The route guidance process 324(1)(A) also receives from the positioning program 210(1) (in FIG. 12) data that indicates the current position of the vehicle. The route guidance process 324(1)(A) also receives from the driver profile program 210(12)(D) (in FIG. 11) data that indicates the driver's preferences related to route guidance. These preferences may include, for example, the language in which the guidance should be provided, the medium (i.e., audio, visual display, both) via which the guidance should be provided, etc. Using these inputs, the route guidance process 324(1)(A) determines what kinds of route guidance should be provided to the driver and when such guidance should be provided. More specifically, as the vehicle approaches certain locations along the selected calculated route, route guidance about required maneuvers is provided to the driver. At appropriate locations, the route guidance process 324(1)(A) provides a data output to the vehicle-user device manager 270 indicating the kind of guidance to be provided.

(The route guidance application 324(1) also provides an output to the driver recorder 225 indicating the guidance provided.)

(7). Obstacle Detection System

Figure 16:
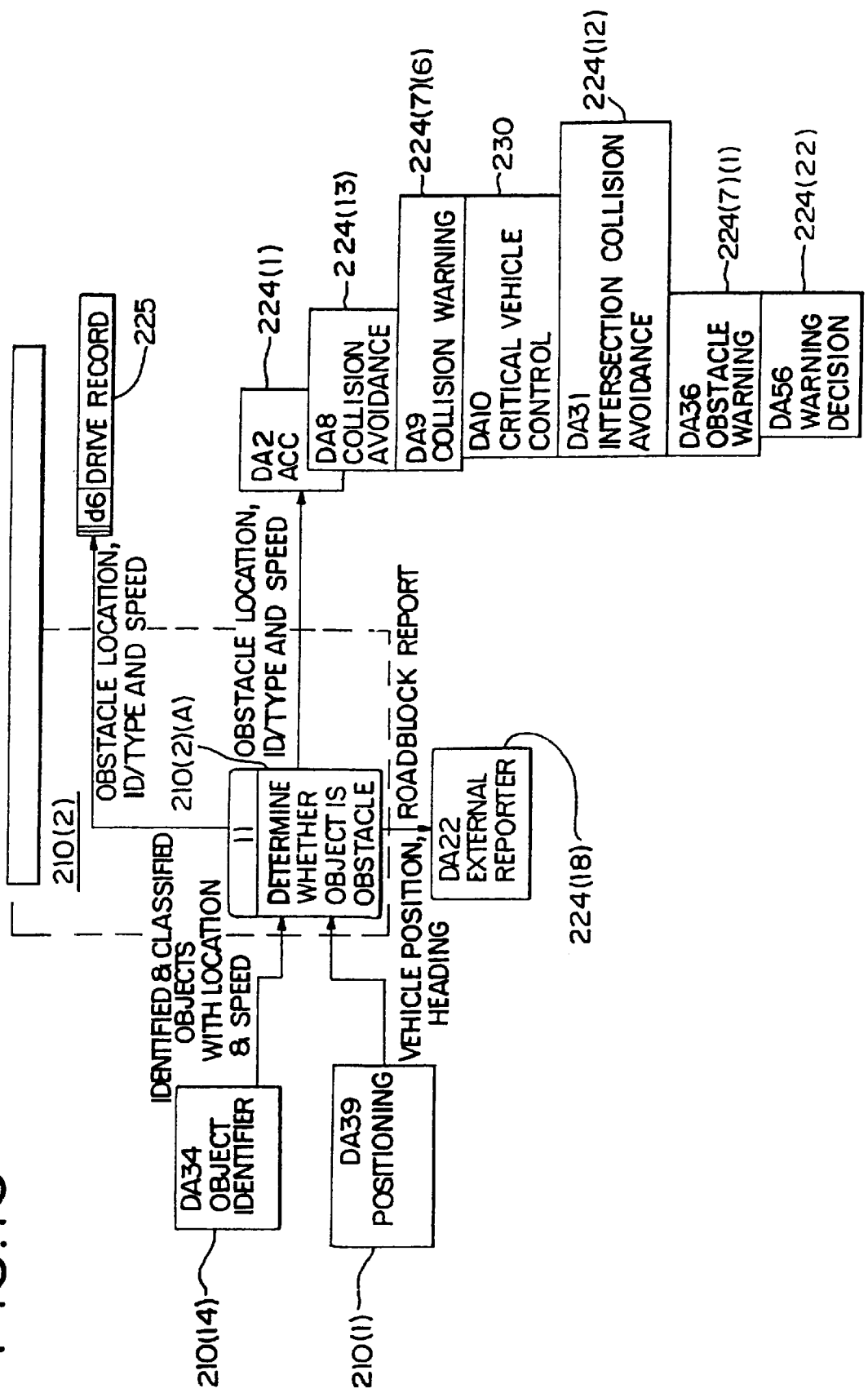
FIG. 16 is a logical data flow diagram illustrating the component processes that form the obstacle detection program shown in FIG. 9.

Referring again to FIG. 9, another of the programs from which the adaptive cruise control application 224(1) receives data is the obstacle detection program 210(2). The obstacle detection program 210(2) operates in conjunction with the image processing program 210(13) and the object identifier program 210(14). FIG. 16 shows the component processes that form the obstacle detection program 210(2), FIG. 17 shows the component processes that form the object identifier program 210(14), and FIG. 18 shows the component processes that form the image processing program 210(13).

Figure 18:
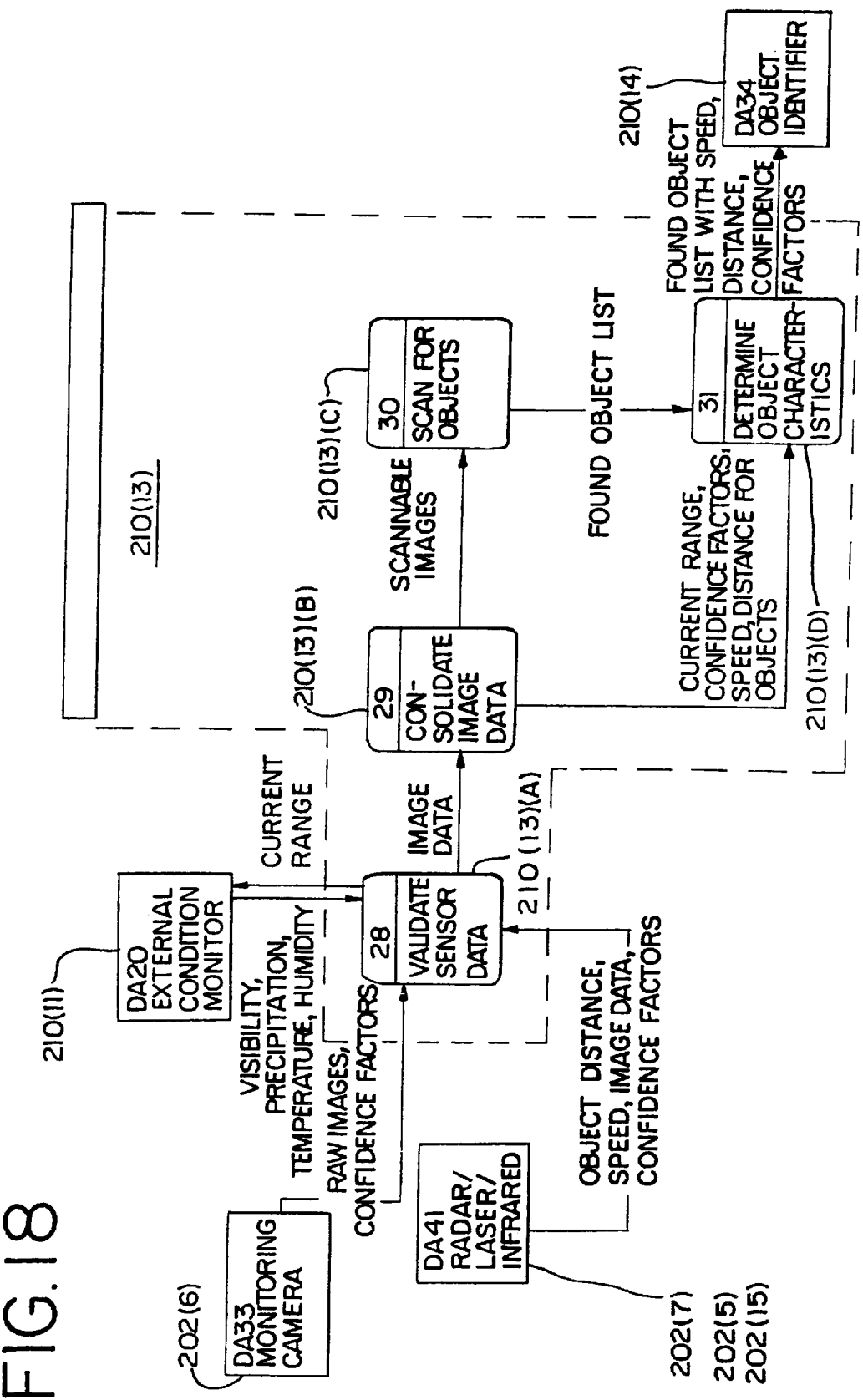
FIG. 18 is a logical data flow diagram illustrating the component processes that form the image processing program shown in FIG. 17.

Referring first to FIG. 18, the component processes that form the image processing program 210(13) are shown. In FIG. 18, the image processing program 210(13) includes a process 210(13)(A) that validates sensor data. This validation process 210(13)(A) receives data indicating visibility, precipitation, temperature, and humidity from the external conditions monitoring program 210(11). This process 210(13)(A) also receives raw image data from the camera 202(6). This process 210(13)(A) also receives data indicating object distance, speed, image, and coordinates from the radar 202(7), laser 202(5), and infrared sensors 202(15). After validating the data, the process 210(13)(A) provides image data to a consolidation process 210(13)(B). The validation process 210(13)(A) also provides data indicating the current range back to the external conditions monitoring program 210(11). The consolidation process 210(13)(B) provides scannable images to a process 210(13)(C) that scans for objects. The process 210(13)(C) that scans for objects provides a list of found objects to a process 210(13)(D) that determines the characteristics of the objects. This characteristics determining process 210(13)(D) also receives from the consolidation process 210(13)(B) data indicating the current range, confidence factors, speed, and distance for the found objects. The characteristics determining process 210(13)(D) outputs a list of found objects including their speed, distance, and confidence factors to the object identifier program 210(14).

Figure 17:
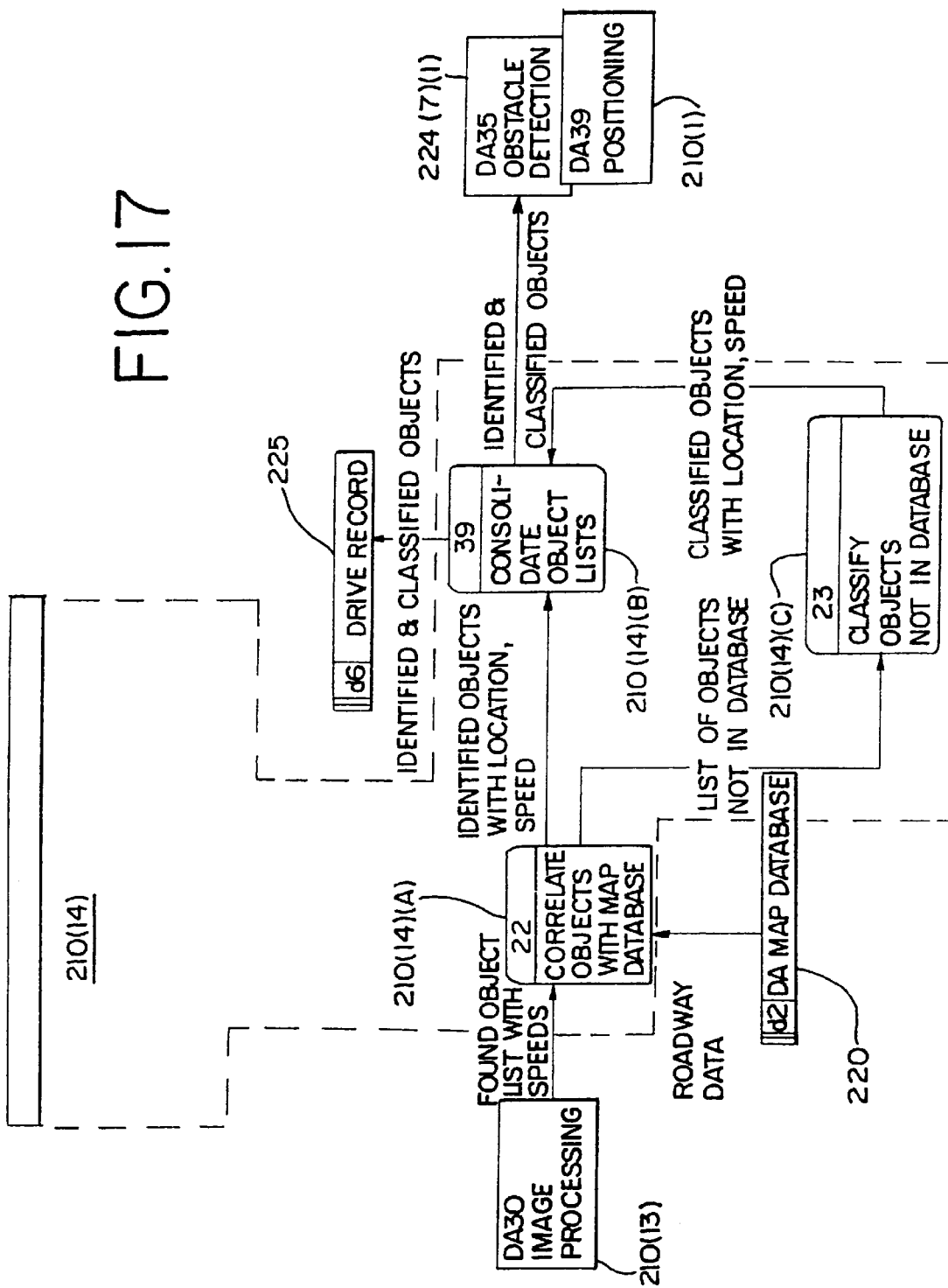
FIG. 17 show a logical data flow diagram illustrating the component processes that form the object identifier program shown in FIG. 16.

Referring to FIG. 17, the component processes that form the object identifier program 210(14) are shown. In FIG. 17, the object identifier program 210(14) includes a correlation process 210(14)(A) that receives the list of found objects including their speed, distance, and confidence factors from the image processing identifier program 210(13). The correlation process 210(14)(A) also uses data from the map database 220. The map database 220 includes data about objects located in the environment in which the vehicle is traveling, including the positions and sizes of the objects. The correlation process 210(14)(A) uses the positions of known objects from the map database 220 to attempt to identify the found objects in the list received from the image processing program 210(13). The correlation process 210(14)(A) provides data indicating the identified objects, along with their location and speed, to a consolidation process 210(14)(B). The correlation process 210(14)(A) provides a list of objects that are not in the database 220 to a classification process 210(14)(C). The classification process 210(14)(C) classifies the objects that were not found in the database 220 by the correlation process 210(14)(A). The classification process 210(14)(C) provides an output to the consolidation process 210(14)(B) that includes an identification of the objects that are not in the database 220 along with a classification of these objects.

The consolidation process 210(14)(B) provides data indicating the objects identified in the database 220 and the objects not identified in the database 220, along with their corresponding classifications, to the drive recorder 225. The consolidation process 210(14)(B) also provides data indicating the objects identified in the database 220 and the objects not identified in the database 220, along with their corresponding classifications, to the obstacle warning application 224(7)(1) and the positioning program 210(1).

Referring to FIG. 16, the component processes that form the obstacle detection program 210(2) are shown. The obstacle detection program 210(2) includes a process 210(2)(A) that determines whether a detected object is an obstacle. This process 210(2)(A) receives data from the object identifier program 210(14) that identifies detected objects including their location and speed. The process 210(2)(A) also receives data from the positioning program 210(1) that indicates the position and heading of the vehicle. The process 210(2)(A) provides an output that identifies the obstacle by type and speed. The process 210(2)(A) provides this data to the adaptive cruise control application 224(1), the collision avoidance application 224(13), the collision warning application 224(7)(6), the critical vehicle control program 230, the intersection collision avoidance application 224(12), the obstacle warning application 224(7)(1), and the warning decision application 224(22). The process 210(2)(A) also provides the data identifying the obstacle by type and speed to the drive recorder 225. If the obstacle detected by the process 210(2)(A) could affect other vehicles, data about the obstacle is also forwarded by the process 210(2)(A) to the external reporter application 224(18) so that a report can be sent to the service facility 16 and relayed to other vehicles.

(8). Adaptive Cruise Control Application

Referring again to FIG. 9, the adaptive cruise control application 224(1) includes a process 224(1)(A) that receives the previously identified data from the driver interface 250, the driver profile recorder 210(12)(D), the positioning system 210(1), route guidance program 324(1), the external condition monitor program 210(11), and the obstacle detection program 210(2). This process 224(1)(A) relates the data relating to obstacles around the vehicle to data relating to the vehicle. For example, the process 224(1)(A) relates the relative speeds and directions of vehicles identified around the vehicle to the speed and direction of the vehicle, taking into account road surface conditions, light conditions, precipitation, tire wear, etc. The relating process 224(1)(A) outputs this information to a speed calculation process 224(1)(B).

The speed calculation process 224(1)(B) calculates a desired vehicle speed. The speed calculation process 224(1)(B) outputs data indicating the calculated speed along with a request to adjust the vehicle speed to the critical vehicle control program 230. The speed calculation process 224(1)(B) continuously updates its calculation to take into account changes in the vehicle environment which might require speeding up, slowing down, or stopping the vehicle. The speed calculation process 224(1)(B) also outputs data indicating the calculated speed and an indication of the request to adjust the vehicle speed to the drive recorder 225. If the speed calculation process 224(1)(B) determines that the adaptive cruise control feature should be disengaged, it also outputs data indicating a request for disengagement to the warning/decision program 224(22). The critical vehicle control program 230 is described below in connection with FIG. 19, the warning/decision program 224(22) is described below in connection with FIG. 20, and the drive recorder 225 is described below in connection with FIG. 29.

(9). Critical Vehicle Control Program.

Figure 19:
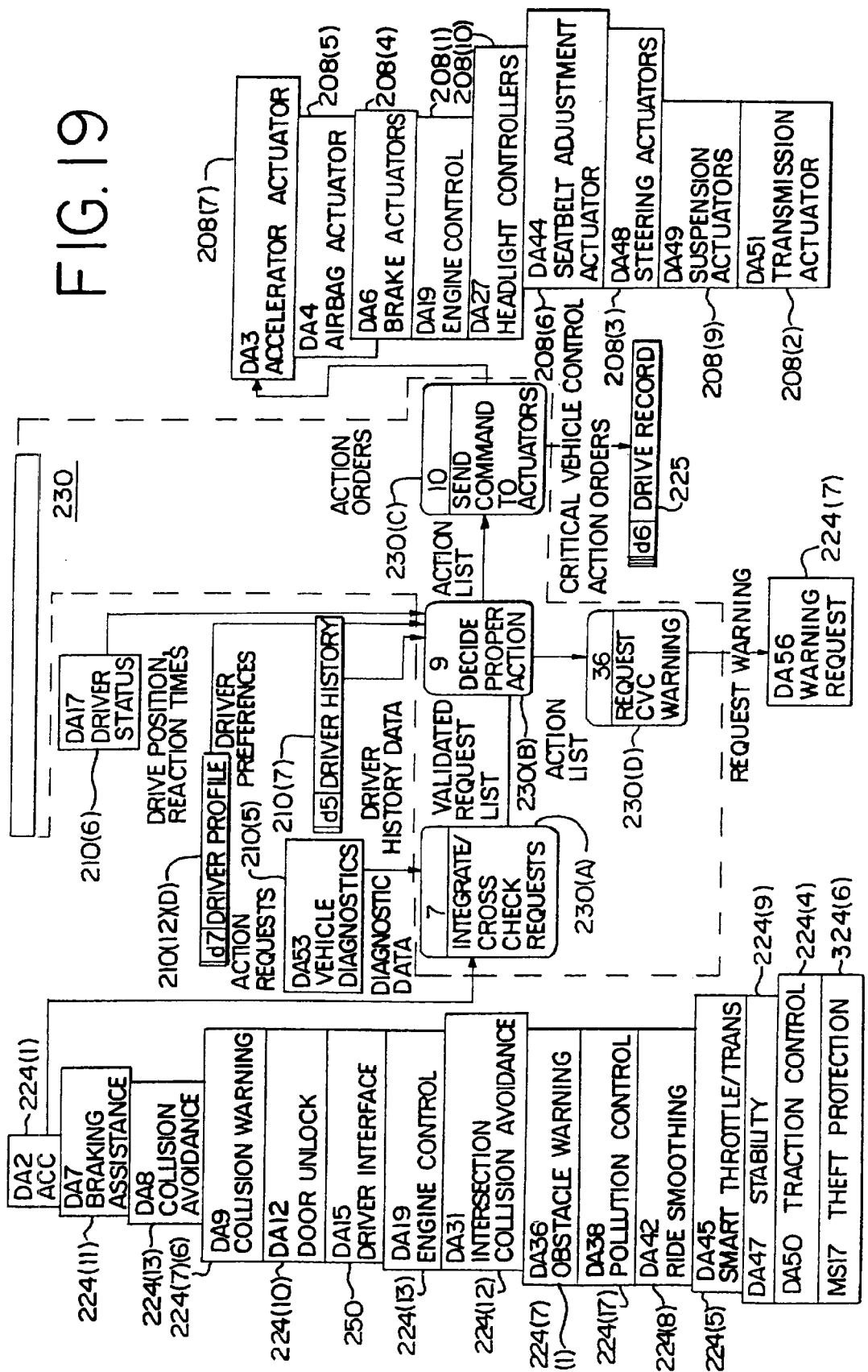
FIG. 19 is a logical data flow diagram illustrating components of the critical vehicle control programming shown in FIG. 9.

FIG. 19 shows the components of the critical vehicle control program 230. The critical vehicle control program 230 includes an integrator process 230(A). The integrator process 230(A) receives inputs from various programs, applications and systems in the vehicle. Specifically, the integrator process 230(A) receives data from the adaptive cruise control application 224(1) indicating a request to set the vehicle speed to a desired speed. Other programs, applications and systems that send requests to the integrator process 230(A) include the braking assistance application 224(11), the collision avoidance application 224(13), the collision warning application 224(7)(6), the door unlock application 224(10), the driver interface 250, the engine control application 224(3), the intersection collision avoidance application 224(12), the obstacle warning application 224(7)(1), the pollution control application 224(17), the ride smoothing application 224(18), the smart throttle and transmission application 224(5), the stability application 224(9), the traction control application 224(4), and the theft protection application 324(6). The integrator process 230(A) also receives diagnostic data from the vehicle diagnostics program 210(5).

The integrator process 230(A) integrates these requests and provides a validated request list to a decision process 230(B). The decision process 230(B) also receives driver history data from the driver history program 210(7), data indicating the driver's preferences from the driver profile program 210(12)(D), and data indicating the driver status from the driver status program 210(6). For example, the driver status data may indicate the driver's reaction times.

The decision process 230(B) uses these inputs to provide an output in the form of an action list. The action list developed by the decision process 230(B) is provided to a send command process 230(C).

The action list output by the decision process 230(B) may also be provided to a warning request process 230(D). Upon receiving an action list that requires that a warning be provided to the driver, the warning request process 230(D) provides an output to the warning decision system 224(22) to request that a warning be provided to the driver. The warning request process 230(D) may include appropriate rules for this purpose.

Upon receiving the action list from the decision process 230(B), the send command process 230(C) provides action orders (or commands) to the various actuators associated with the respective vehicle systems and hardware 208. Specifically, the send command process 230(C) provides action orders to the accelerator actuator 208(5), the airbag actuator 208(5), the brake actuator 208(4), the engine controllers 208(1), the headlight controllers 208(10), the seatbelt adjustment actuator 208(6), the steering actuator 208(3), the suspension actuator 208(9), and the transmission actuator 208(2). The send command process 230(C) also provides a copy of the action orders to the drive recorder 225.

(10). Warning Decision Application

Figure 20:
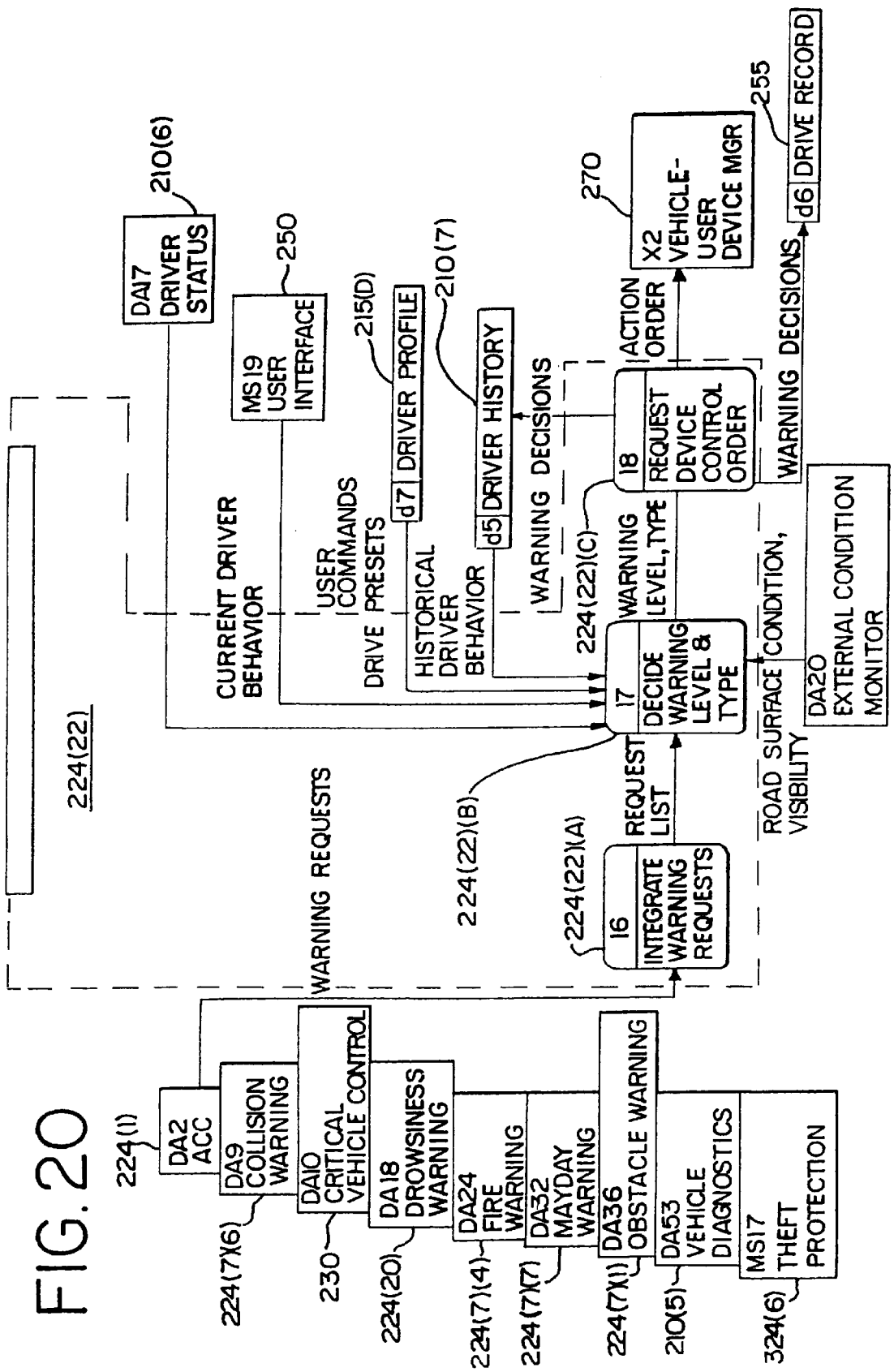
FIG. 20 is a logical data flow diagram illustrating components of the warning decision application shown in FIG. 9.

FIG. 20 shows the components of the warning decision application 224(22) shown in FIG. 9. The warning decision application 224(22) includes an integrator process 224(22)(A). The integrator process 224(22)(A) receives requests from various programs, applications and systems in the vehicle. The programs, applications and systems that send requests to the warning decision process 224(22) include the adaptive cruise control application 224(1), the collision warning application 224(7)(6), the obstacle warning application 224(7)(1), the theft protection application 324(6), the critical vehicle control program 230, the drowsiness warning application 224(20), the mayday warning application 224(7)(7), the vehicle diagnostics program 210(5) and the fire warning program 224(7)(4). The integrator process 224(22)(A) integrates warning requests from these various systems and outputs a request list to a process 224(22)(B) that decides the warning level and type. This decision process 224(22)(B) also receives data indicating the current behavior of the driver from the driver status program 210(6), data indicating the commands requested by the driver from the driver interface 250, data indicating the historical behavior of the driver from the driver history log 210(7), driver preferences from the profile data file 215(D), and data indicating external conditions, such as hazardous driving conditions, sensed around the vehicle by the external condition monitor application 210(11). Based upon these inputs, the warning decision process 224(22)(B) outputs data indicating a warning level and type associated with the warning request received from the integrator process 224(22)(A). This data is provided to a process 224(22)(C) that requests a device control order.

The process 224(22)(C) provides an action order to the vehicle-user device manager 270. The action order commands the vehicle-user device manager 270 to provide a warning to the driver via the driver interface 250. The type of warning is determined by the warning level and type determined by the process 224(22)(B). For example, a relatively low level warning may result in a warning light being displayed whereas a relatively high level warning may result in audio and visual warnings. The process 224(22)(C) also provides data indicating the warning decision to the drive recorder 225. (The process 224(22)(C) may also provide data indicating the warning type and level to the external reporter application 224(18).)

As mentioned above, when the adaptive cruise control application 224(1) determines that the adaptive cruise control feature should be disengaged, it sends a request to the warning decision program 224(22). The integration process 224(22)(A) integrates this request along with requests, if any, received from other programs, applications, and systems. The integrator process 224(22)(A) includes the request from the adaptive cruise control application 224(1) in a request list to the decision process 224(22)(B). The decision process 224(22)(B) uses the data inputs from the driver status program 210(6), the driver interface 250, the driver history log 210(7), and the driver profile data file 215(D) to determine a warning level and type which is output to the process 224(22)(B) that sends an action order to the vehicle-user device manager 270.

(11). Vehicle-User Device Manazer

Figure 21:
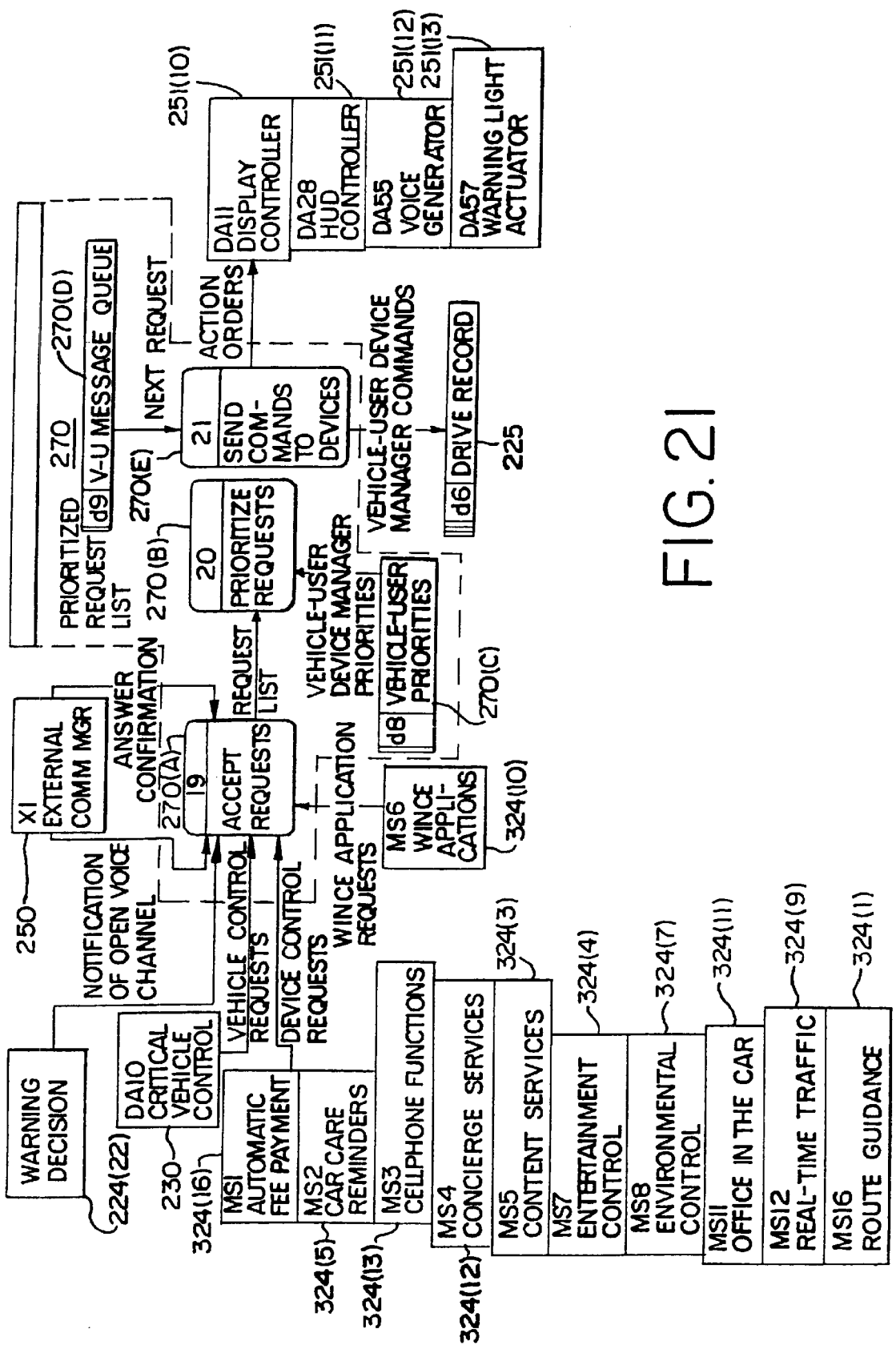
FIG. 21 is a logical data flow diagram illustrating the component processes that form the vehicle-user device manager shown in FIG. 9.

FIG. 21 shows the component processes that form the vehicle-user device manager 270 shown in FIG. 9. In FIG. 21, the vehicle-user device manager 270 includes a first process 270(A) that accepts requests from various other components of the in-vehicle computing architecture system over the networked data processors 212 (in FIGS. 2 and 3). Included among the components from which the vehicle-user device manager process 270(A) receives requests are the automatic fee payment application 324(14), the car care reminder application 324(8), the cellphone function application 324(13), the concierge services application 324(12), the content services application 324(3), the entertainment control application 324(4), the environment control application 324(7), the office-in-the-car application 324(11), the real-time traffic application 324(9), and the route guidance application 324(1). Each of these components sends device control requests to the vehicle-user device manager 270. The request receiving process 270(1) also receives vehicle control requests from the critical vehicle control program 230 and the warning decision program 224(22). The request receiving process 270(A) also receives notifications of open voice channels and answer confirmations from the with external communications manager 260. If a Win CE™ application 324(10) is present, the request receiving process 270(A) also receives requests from the Win CE™ application 324(10).

The request receiving process 270(A) outputs a request list to a prioritization process 270(B). The prioritization process 270(B) uses a stored listing of vehicle-user priorities 270(C) to form a prioritized request list which is provided to a vehicle-user manager queue 270(D). The vehicle-user device manager 270 also includes a command sending process 270(E). The command sending process 270(E) obtains requests from the queue 270(D) and sends action orders to the display controller 251(10), the heads-up controller 251 (11), the voice generator 251(12), and the warning light actuator 251(13), all of which are part of the driver interface 250 shown in FIG. 10. The command sending process 270(E) also sends data to the drive recorder 225 indicating the action orders that had been sent to the display controller 251(10), the heads-up controller 251(11), the voice generator 251(12), and the warning light actuator 251(13).

B. Automated Mayday (1). Overview

The in-vehicle computing architecture provides manual and automatic mayday features. The manual mayday feature allows a driver or passenger to transmit a request for emergency assistance. The automated mayday feature automatically transmits a request for appropriate assistance under certain conditions, such as a vehicle accident, medical emergencies, and so on. The manual mayday feature is described in connection with FIG. 23. The automated mayday feature is described in connection with FIGS. 22–24.

Figure 22:
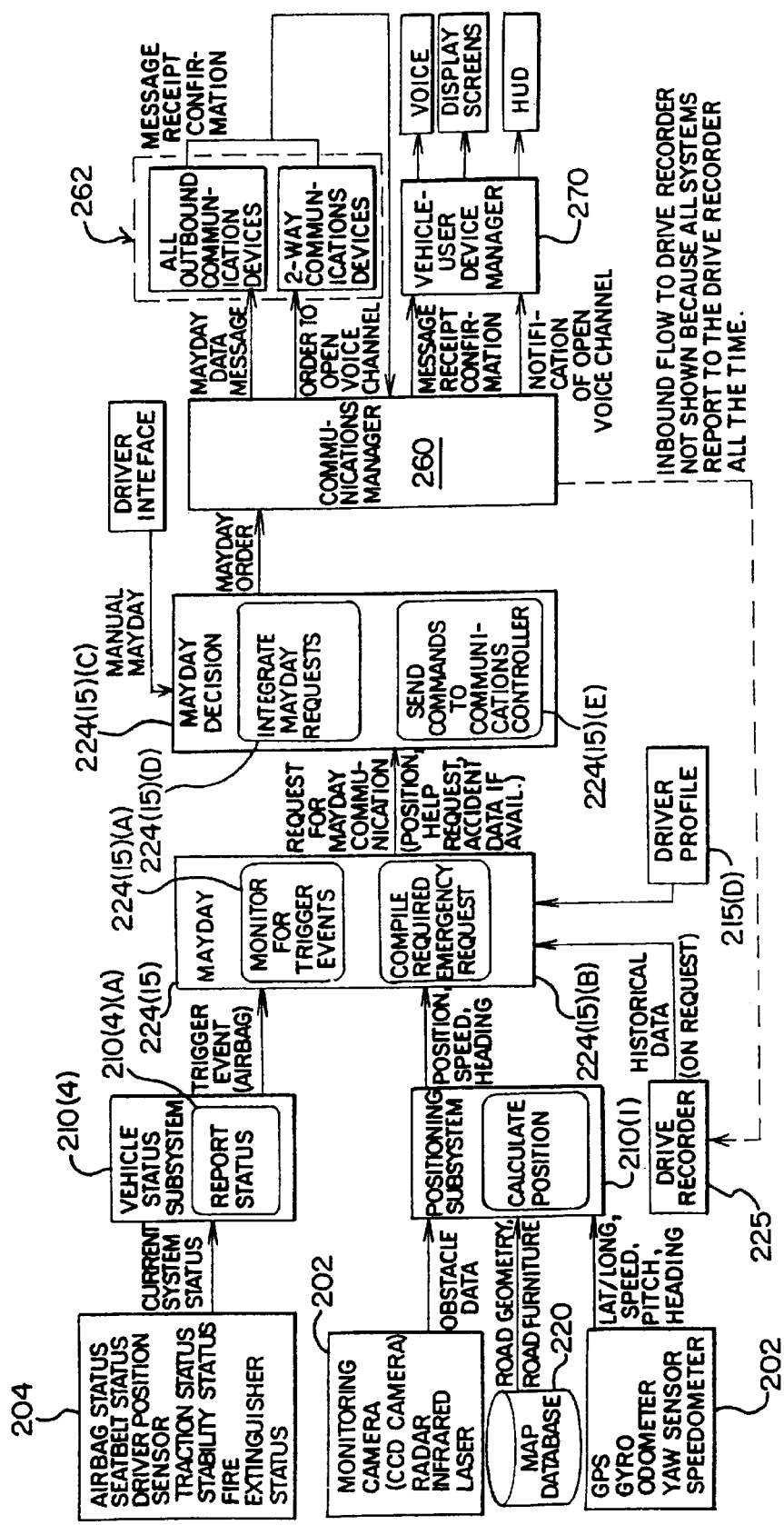
FIG. 22 is a logical data flow diagram illustrating the components that form the automated mayday system shown in FIG. 6.

Referring first to FIG. 22, there is shown a block diagram showing the major components that provide the automated mayday feature. This automated mayday feature is provided by a combination of components, including software and hardware components in the mobile information and services portion of the in-vehicle computing architecture as well as software and hardware components in the driver assistance portion. The automated mayday feature is organized around the automated mayday application 224(15). The automated mayday application 224(15) receives data from and outputs data to other systems, programs and applications included in the in-vehicle architecture. These other systems, programs and applications are described in the sections that follow.

(2). Vehicle Status Subsystem

Referring to FIG. 22, one of the components from which the automated mayday application 224(15) receives data is the vehicle status program 210(4). The vehicle status program 210(4) receives status data from various sensors associated with vehicle hardware components and systems, including the airbag status sensors 204(6), the seatbelt status sensors 204(13), the driver and passenger position sensors 204(10), the traction sensor 204(9), the stability status sensors 204(14), and the fire extinguisher status sensor 204(8), among others. The vehicle status program 210(4) integrates the status data received from these sensors. The vehicle status program 210(4) includes a reporting process 210(4)(A) that provides a data output reporting the status data to the automated mayday application 224(15).

(3). Positioning system

Another of the components from which the automated mayday application 224(15) receives data is the positioning system 210(1). The positioning system 210(1) is described above in connection with FIG. 12. The positioning system 210(1) receives data output from the geographic database 220 and the sensors 202 and 204. The positioning system 210(1) provides data to the automated mayday application 224(15) indicating the position, speed, and heading of the vehicle.

(4). Automated Mayday Application

In FIG. 22, the automated mayday application 224(15) includes a process 224(15)(A) that monitors the data received from the vehicle status application 210(4) and the positioning system 210(1). The monitoring process 224(15)(A) scans this data for triggering events. Upon detection of a triggering event, the monitoring process 224(15)(A) provides a request to a process 224(15)(B) that compiles an emergency request. This process 224(15)(B) uses the appropriate data from the vehicle status program 210(4) and the positioning system 210(1) in formulating the data to include in the request. If appropriate, the mayday request compiling process 224(15)(B) also obtains data from the driver profile 210(12)(D). For example, the mayday request compiling process 224(15)(B) may obtain the driver's medical history data from the driver profile 210(12)(D). The mayday request compiling process 224(15)(B) may also obtain the passenger medical history data from the passenger profile 210(12)(P). If appropriate, the mayday request compiling process 224(15)(B) also obtains data from the drive recorder 225 indicating pertinent historical data relating to the vehicle.

The mayday compiling process 224(15)(B) provides a data output that includes the vehicle position, the type of help requested, accident data, if available, and so on. The mayday compiling process 224(15)(B) provides this data output in a request for a mayday communication to a mayday decision application 224(15)(C).

(5). Manual Mayday Application

The mayday decision application 224(15)(C) also receives input from the manual mayday application 324(15). The manual mayday application 324(15) provides a means by which the driver or passengers can voluntarily request emergency assistance. The operation of the manual mayday application 324(15) is coordinated with the automatic mayday application 224(15) to reduce the possibility of conflicts between manual and automated mayday requests.

Figure 23:
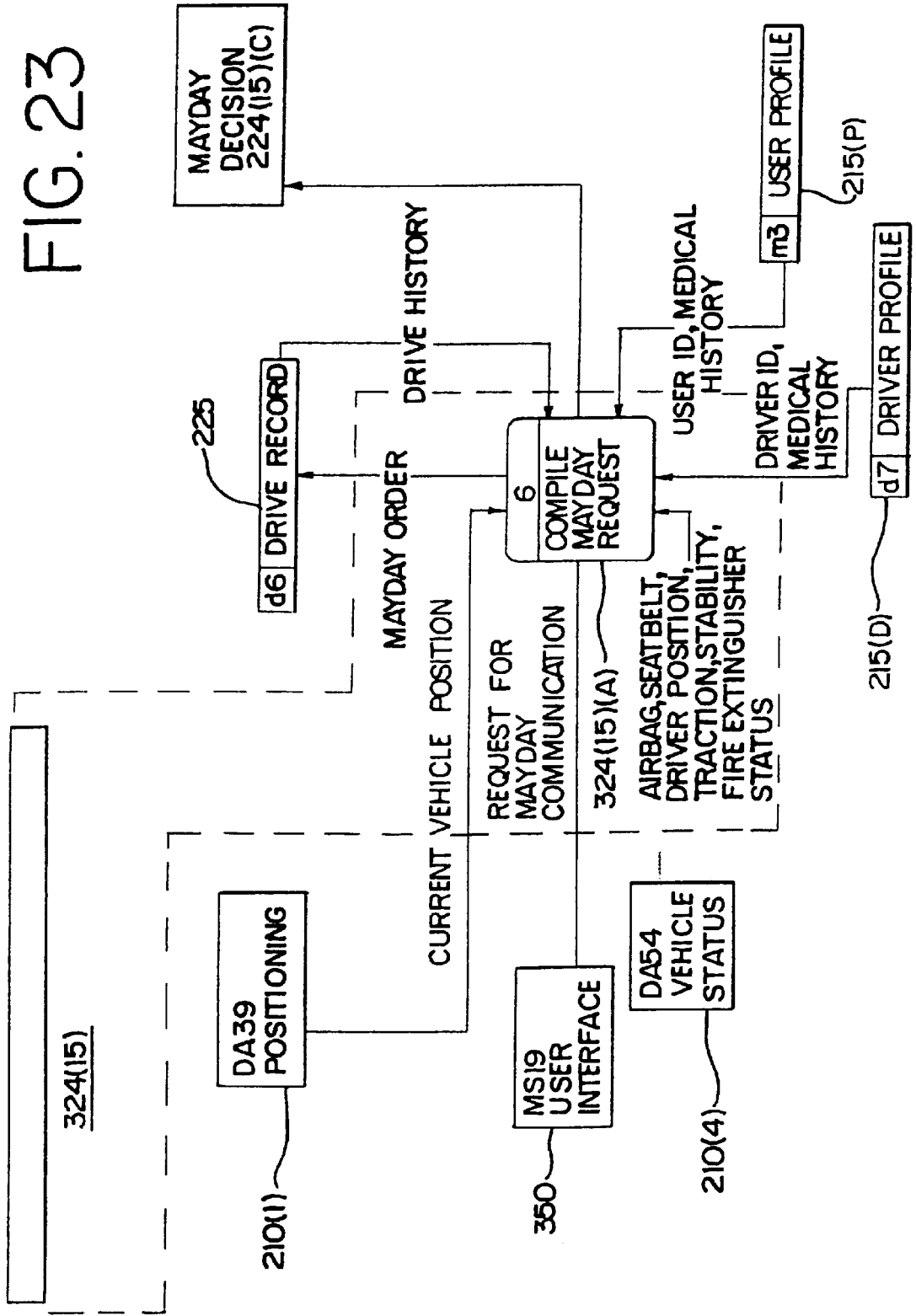
FIG. 23 is a logical data flow diagram illustrating the component processes that form the manual mayday application shown in FIG. 22.

FIG. 23 shows the components that form the manual mayday application 324(15). In FIG. 23, the manual mayday application 324(15) includes a manual mayday request compiling process 324(15)(A). The manual mayday request compiling process 324(15)(A) receives data requests for mayday assistance from the user interface 350. The manual mayday request compiling process 324(15)(A) also receives data from the vehicle status application 210(4). The data received from the vehicle status application 2210(4) indicates the status of various hardware sensors, including the airbag sensor 204(6), the seatbelt sensor 204(13), the driver and passenger position sensors 204(10), the traction sensor 204(9), the stability status sensors 204(14), the fire extinguisher status sensor 204(8), among others. The manual mayday request compiling process 324(15)(A) also receives data from the positioning system 210(1) indicating the position, speed, and heading of the vehicle.

If appropriate, the manual mayday request compiling process 324(15)(A) also obtains data from the drive recorder 225 indicating pertinent historical data relating to the vehicle. Also if appropriate, the manual mayday request compiling process 324(15)(A) receives data from the driver profile data file 215(D) indicating the medical history of the driver and data from the passenger profile data file 215(P) indicating the medical histories of the passengers.

The manual mayday request compiling process 324(15)(A) compiles the input data and provides an output to the mayday decision application 224(15)(C). The manual mayday request compiling process 324(15)(B) may also output data to the driver recorder 225 indicating that a manual mayday request was made.

(6). Mayday Decision Application

Referring again to FIG. 22, the mayday decision application 224(15)(C) receives the mayday requests from the automated mayday application 224(15) and the manual mayday application 324(15). The mayday decision application 224(15)(C) includes a process 224(15)(D) that integrates the mayday requests. For example, if the automated mayday application 224(15) requests a mayday communication related to a vehicle accident and meanwhile the driver operates the manual mayday application 324(15) to request a mayday communication for the same vehicle accident, the integration process 224(15)(D) merges these requests into a single mayday request. The integration process 224(15)(D) outputs this merged request to a process 224(15)(E) that outputs a command to the communication manager 260 to send a mayday request to the service provider 16 or other appropriate entity.

(7). Communication Manager

Figure 24:
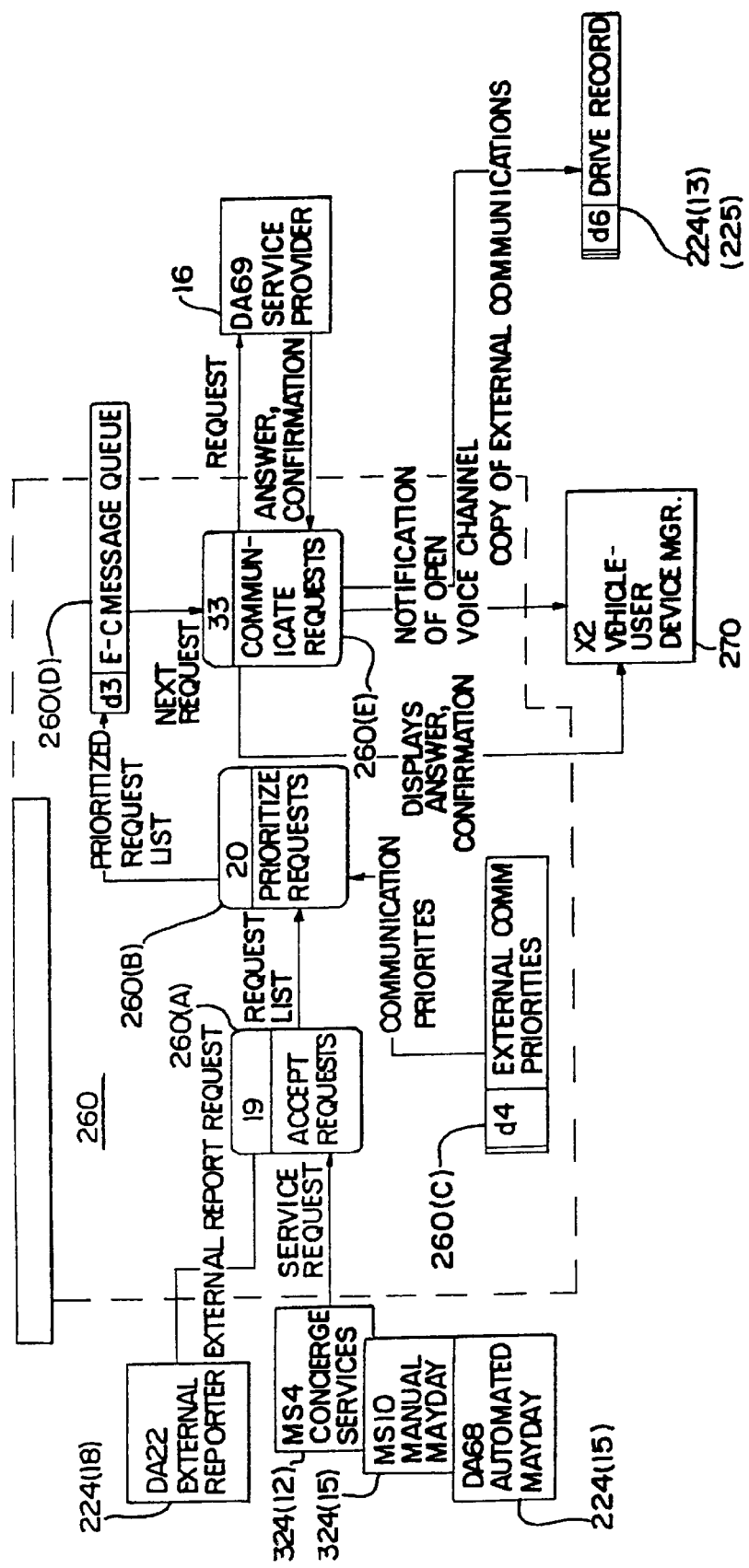
FIG. 24 is a logical data flow diagram illustrating the component processes of the external communication manager system shown in FIG. 22.

FIG. 24 shows the component processes that form the external communications manager 260. In FIG. 24, the external communications manager 260 includes a process 260(A) that accepts requests. This request accepting process 260(A) accepts requests from the process 224(15)(E) in the mayday decision application 224(15)(C). This request accepting process 260(A) also accepts requests from the external reporter application 224(18) and the concierge services application 324(12). The request accepting process 260(1) outputs a request list to a process 260(B) that prioritizes the requests. This prioritization process 260(B) uses a listing of communications priorities stored in a non-volatile memory 260(C) of the vehicle. The prioritization process 260(B) provides a prioritized output list to an external message queue 260(D). From the queue 260(D), a communication process 260(E) commands the appropriate communication hardware 262 (in FIG. 2) to send requests to the service provider 16 or other appropriate entity.

The communication process 260(E) also receives data from the service provider 16 or other entities. The data received from the service provider 16 may be either an answer to the request or a confirmation of receipt of the request. The communication process 260(E) sends the answer or the confirmation received from the service provider 16 to the vehicle-user device manager 270 for display to the driver or passenger. (The vehicle-user device manager is described in more detail in FIG. 21, above.)

The communication process 260(E) also sends data to the drive recorder 225 indicating the action of sending the request to the service provider 16, including the time, the type of message, and so on. The communication process 260(E) also sends data to the drive recorder 225 indicating whether an answer or confirmation was received from the service provider 16 in response to the request, including the time of receipt, and so on.

If the driver or end user are using the external communication manager to initiate a voice telephone call, the communication process 260(E) provides data to the vehicle user device manager 270 notifying the end user of an open line.

C. External Reporter System

Figure 25:
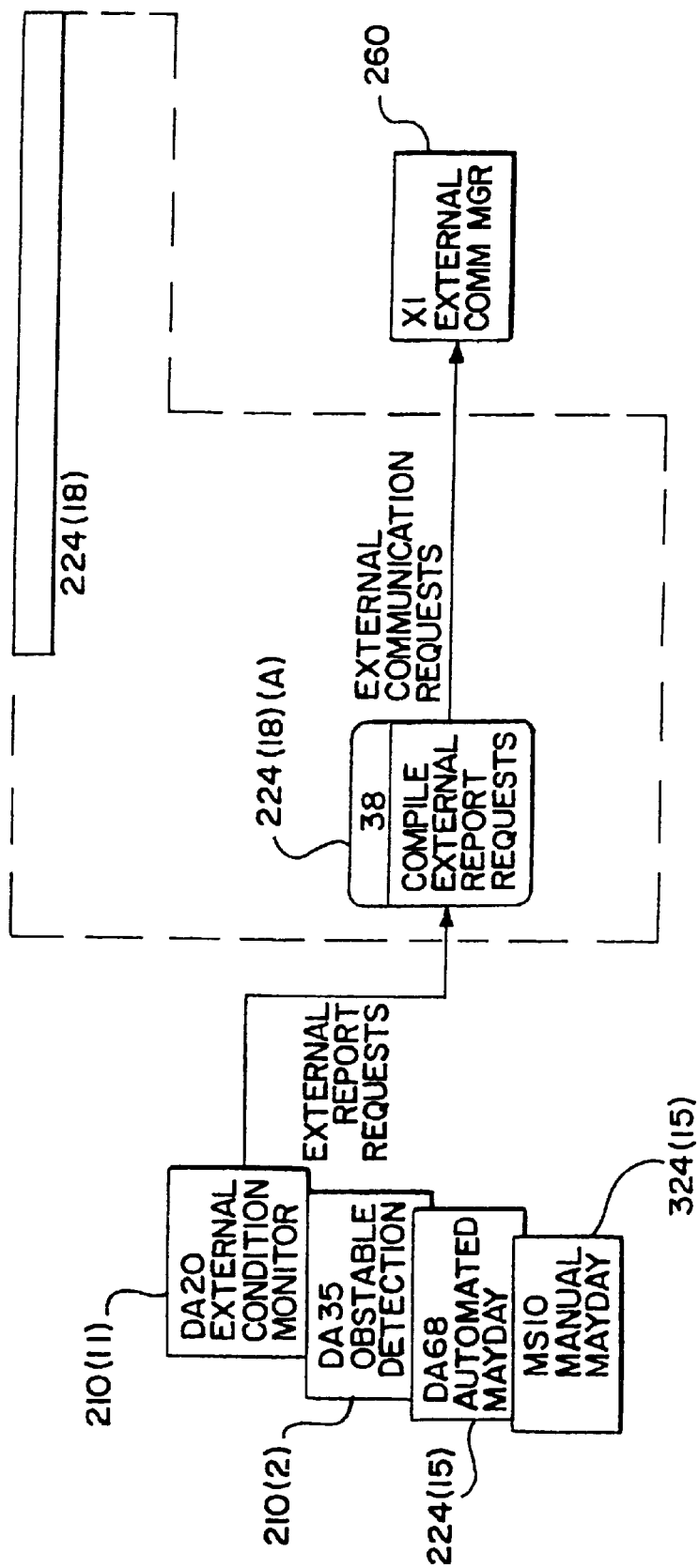
FIG. 25 is a logical data flow diagram illustrating the component processes that form the external reporter application shown in FIG. 24.

In connection with the description of FIG. 24, it was stated that the communications manager 260 includes a process 260(A) that accepts requests from the external reporter application 224(18). FIG. 25 shows the component processes that form the external reporter application 224 (18). The external reporter application 224(18) includes a process 224(18)(A) that compiles external report requests from the external condition monitor 210(11) and the obstacle detection program 210(2). The process 224(18)(A) may also compile requests from the automated mayday application 224(15) and the manual mayday application 324(15). The external condition monitor 210(11) may request that detected information about external conditions, such as precipitation or hazardous road conditions, be transmitted to the service provider 16 in order to be relayed to other vehicles. Similarly, the obstacle detection program 210(2) may request that information about newly detected obstacles, such as stalled vehicles, be transmitted to the service provider 16 in order to be relayed to other vehicles. The compiling process 224(18)(A) in the external condition reporter application 224(18) provides a data output to the request accepting process 260(A) in the communications manager 260, as mentioned above.

D. Concierge Services

Figure 26:
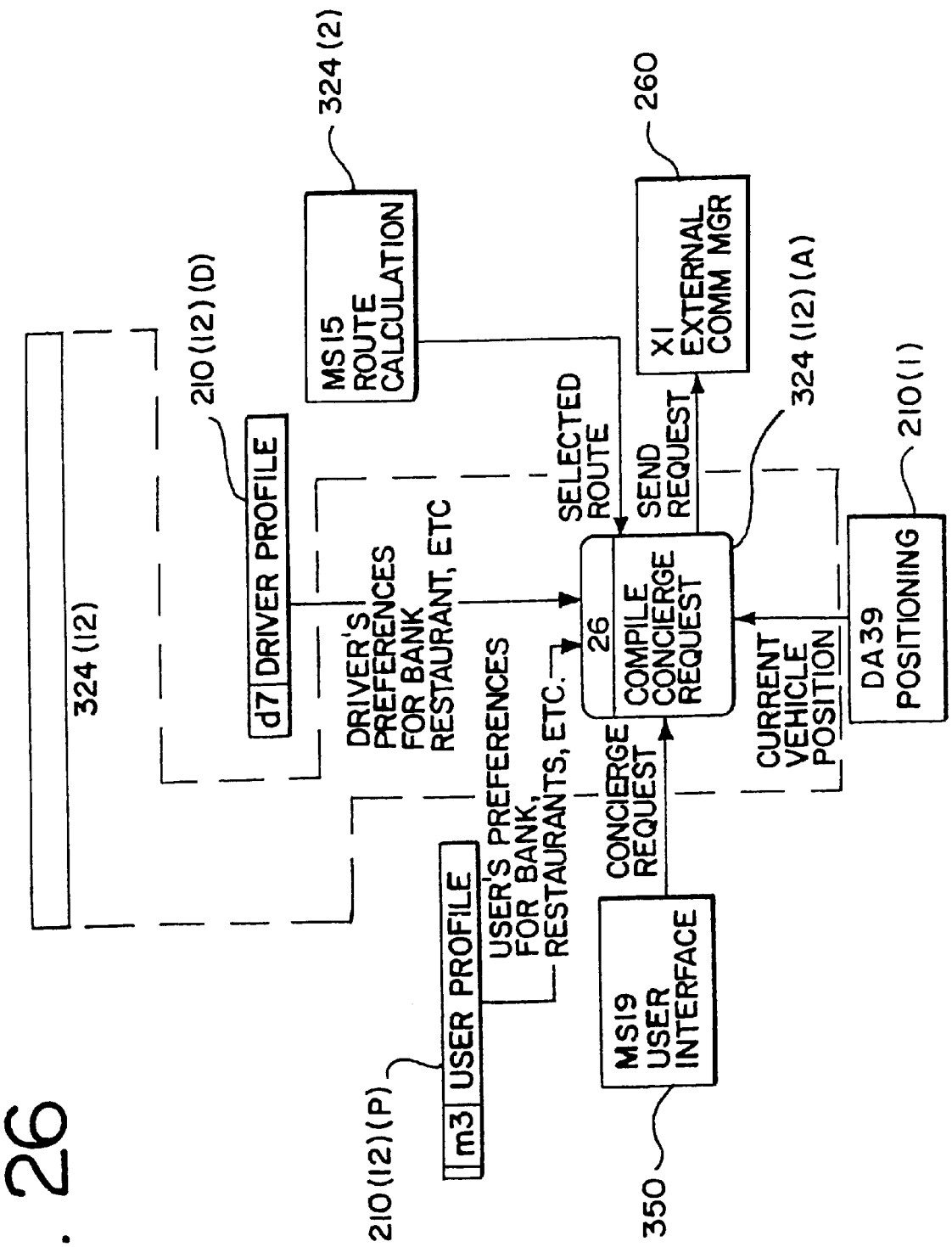
FIG. 26 is a logical data flow diagram illustrating the component processes that form the concierge application shown in FIG. 24.

In connection with the description of FIG. 24, it was stated that the communications manager 260 includes a process 260(A) that accepts requests from the concierge services application 324(12). FIG. 26 shows the component processes that form the concierge services application 324 (12). The concierge services application 324(12) includes a process 324(12)(A) that compiles concierge requests. Concierge requests may be received from the driver and/or passenger(s) through the user interface 350. The concierge request compiling process 324(12)(A) also receives data related to the selected route along which the vehicle is traveling from the route calculation application 324(2). The concierge request compiling process 324(12)(A) receives data related to the driver from the driver profile 210(12)(D) and data related to the passenger(s) from the passenger profile 210(12)(P). The concierge request compiling process 324(12)(A) also receives data indicating the current vehicle position from the positioning system 210(1). Using all these data inputs, as appropriate, the concierge request compiling process 324(12)(A) automatically constructs an appropriate request for concierge services. The request is provided to the external communications manager 260 (in FIG. 24).

E. Obstacle/collision warning system

The in-vehicle computing architecture provides for an obstacle/collision warning system. This feature automatically provides a warning to the driver in the event that a collision with an obstacle or another vehicle is possible. The obstacle/collision warning feature is described in connection with FIG. 27.

Figure 27:
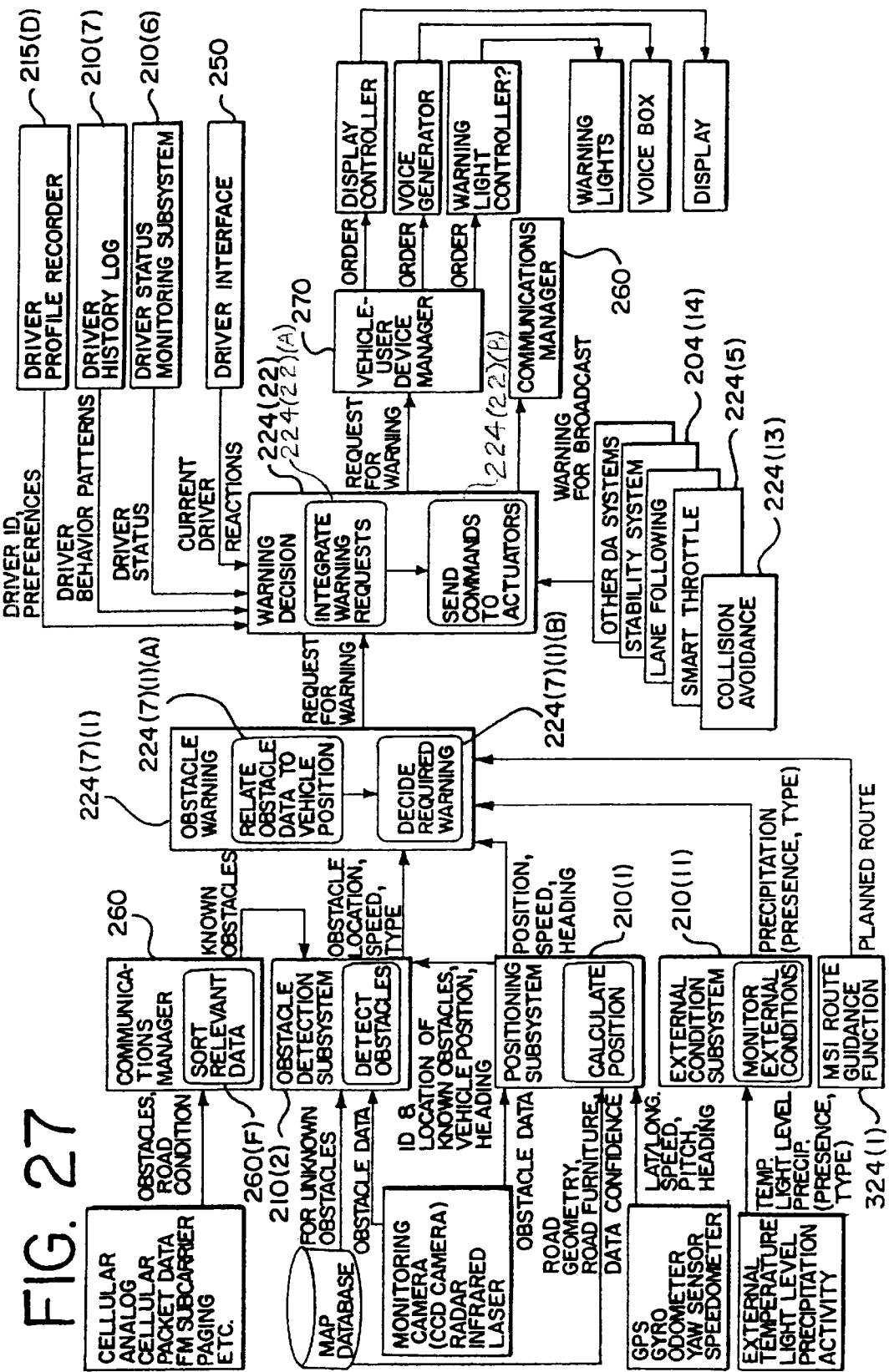
FIG. 27 is a logical data flow diagram illustrating the component processes that form the obstacle/collision warning application shown in FIG. 6.

Referring to FIG. 27, the obstacle/collision warning system is organized around the obstacle warning application 224(7)(1). The obstacle warning application 224(7)(1) receives data relating to the planned route from the route guidance application 324(1). (The route guidance application 324(1) is described above in connection with FIG. 14.) The obstacle warning application 224(7)(1) also receives data identifying the current vehicle position, speed and heading from the positioning system 210(1). (The positioning system 210(1) is described above in connection with FIG. 12.) The obstacle warning application 224(7)(1) receives data relating to the external conditions, such as precipitation, road conditions, etc., from the external condition monitor 210(11). (The external condition monitor program is described above in connection with FIG. 13.) The obstacle warning application 224(7)(1) also receives data about detected obstacles from the obstacle detection system 210(2). (Portions of the obstacle detection system 210(2) are described above in connection with FIGS. 16, 17 and 18.) As mentioned above in connection with FIGS. 16, 17 and 18, the obstacle detection system 210(2) includes processes that identify objects around the vehicle, determine what type of obstacle a detected object is, and determine the speed and location of detected, identified obstacles. As shown in FIG. 27, the obstacle detection system 210(2) receives data from the communications manager 260. (Portions of the communications manager 260 are described above in connection with FIG. 24.) In FIG. 27, the communications manager 260 includes a process 260(F) that receives data sent from sources outside the vehicle. These sources outside the vehicle may include the service provider 16, traffic broadcast services, other vehicles, and so on. The data provided by these source outside the vehicle may relate to obstacles and/or road conditions that are detected by others. The process 260(F) in the communications manager 260 sorts the relevant data received from sources outside the vehicle and provides an output identifying these known obstacles and road conditions to the obstacle detection system 210(2). The obstacle detection system 210(2) accepts the data provided from the communications manager 260 related to obstacles detected by others. The obstacle detection system 210(2) provides data about both obstacles detected by the vehicle as well as obstacles detected by others to the obstacle warning application 224(7)(1). The data provided to the obstacle warning application 224(7)(1) identifies the detected obstacles by type, location and speed;

The obstacle warning application 210(7)(1) includes a process 210(7)(1)(A) that accepts the data about detected obstacles from the obstacle detection system 210(2). This process 210(7)(1)(A) relates this information to the information that identifies the current position (including heading and speed) of the vehicle received from the positioning system 210(1) and the route guidance application 324(1). The obstacle warning application 210(7)(1) includes a process 210(7)(1)(B) that makes a determination based upon the data related by the process 210(7)(1)(A) whether a warning is required. If the process 210(7)(1)(B) determines that a warning is required, a request to provide a warning is provided to the warning decision application 224(22).

The warning decision application 224(22) accepts data relating to the driver's preferences from the drive profile recorder 210(12)(D). The warning decision application 224(22) accepts data relating to the driver's behavior patterns from the driver history log 210(7). Also, the warning decision application 224(22) accepts data relating to the driver's status from the driver status monitor 210(6). In addition, the warning decision application 224(22) accepts data relating to the driver's current reactions from the driver interface 250. In addition to these inputs, the warning decision application 224(22) accepts data from other driver assistance systems, including the stability system 204(14), the smart throttle 224(5), and the collision avoidance system 224(13). The warning decision application 224(22) includes a process 224(22)(A) that integrates all these inputs. This process 224(22)(A) provides an output to a sending process 224(22)(B). The sending process 224(22)(B) sends a request to the vehicle-user device manager 270 to provide warnings to the driver. (Components of the vehicle-user device manager 260 are described above in connection with FIG. 21.) The vehicle-user device manager 260 provides command orders to the various appropriate components of the driver interface 250 to provide appropriate warnings to the driver. The sending process 224(22)(B) in the warning decision application 224(22) also sends a request to the communications manager 260 to inform the service provider 16 or other drivers about the warning.

F. Enhanced curve warning system

Figure 28:
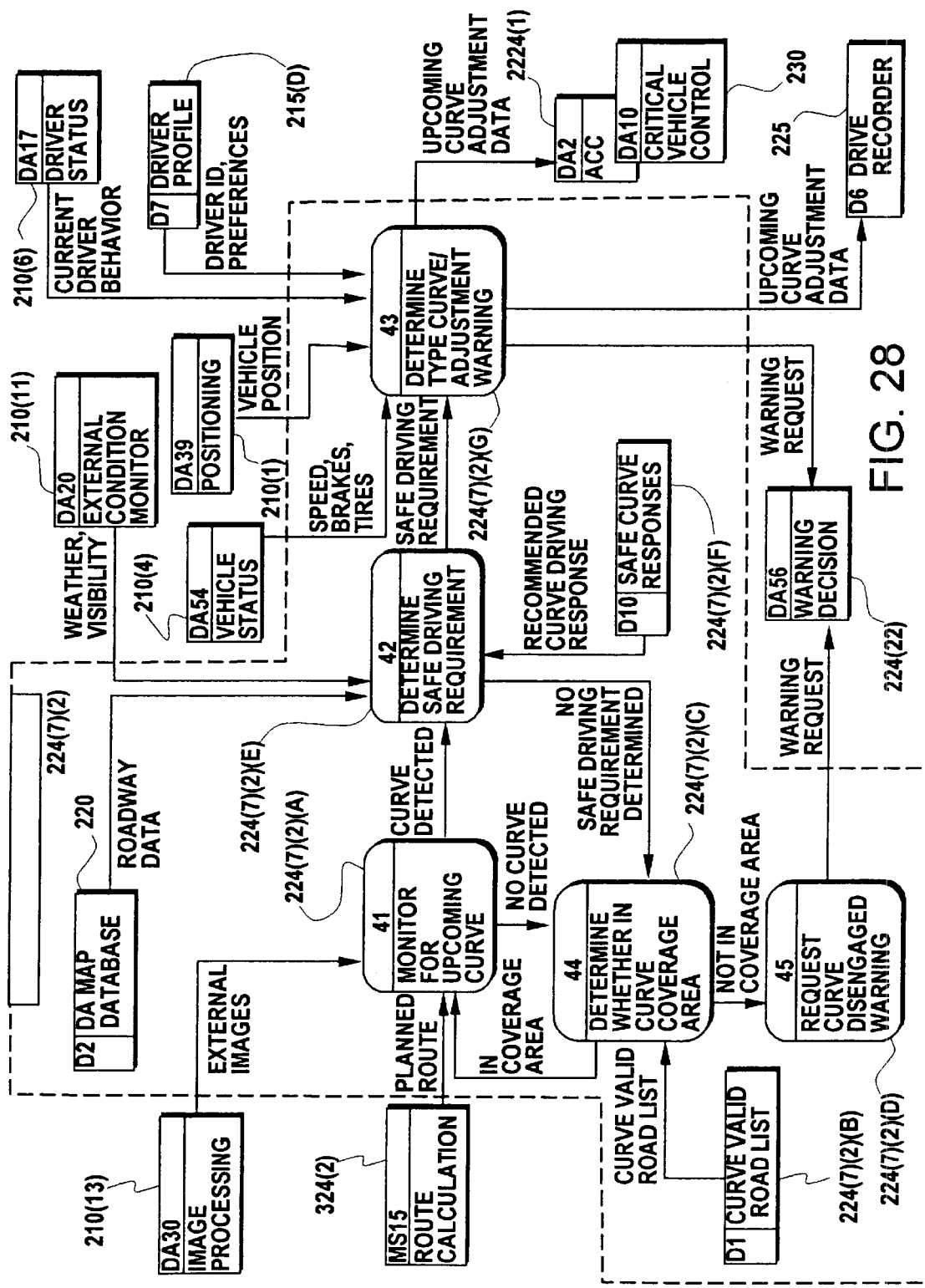
FIG. 28 is a logical data flow diagram illustrating the component processes that form the enhanced curve warning application shown in FIG. 6.

The in-vehicle computing architecture provides for an enhanced curve warning system. The enhanced curve warning system is implemented using the curve warning application 224(7)(2). Referring to FIG. 28, the enhanced curve warning system includes a process 224(7)((2)(A) that receives data from the image processing application 210(13) and the route calculation application 324(2). Specifically, the process 224(7)(2)(A) receives data indicating the planned route from the route calculation application 324(2) and data indicating the external images from the image processing application 210(13). The process 224(7)(2)(A) monitors these data for upcoming curves along the route the vehicle is travelling. On a continuing basis while no curve is detected, the monitoring process 224(7)(2)(A) checks to confirm that the vehicle is within a coverage area of a curve valid road list 224(7)(2)(B). A process 224(7)(2)(C) uses the valid curve list 224(7)(2)(B) and data from the process 224(7)((2)(A) to determine whether the vehicle position is within the coverage area of the curve valid road list 224((7)(2)(B). If the vehicle is outside the coverage area of the curve valid road list 224((7)(2)(B), the process 224(7)(2)(C) provides an output to a process 224(7)(2)(D) that requests that a warning be provided to the driver to inform him/her that the curve warning feature is disengaged. The process 224(7)(2)(D) provides this output to the warning decision application 224(22) which in turn provides an appropriate warning to the driver consistent with the priorities and preferences associated with the warning decision application 224(22), described above. If the process 224(7)(2)(C) determines that the vehicle is within the coverage area of the curve valid road list 224(7)(2)(B), the process 224(7)(2)(C) provides an output back to the process 224(7)(2)(A) so indicating.

If the process 224(7)(2)(A) detects a curve ahead, an output is provided to a process 224(7)(2)(E) that determines a safe driving requirement. The process 224(7)(2)(E) receives inputs from the map database 220 and the external condition monitor 210(11). Specifically, the process 224(7)(2)(E) receives roadway data from the map database 220 and data indicating the weather and visibility conditions from the external condition monitor 210(11). The process 224(7)(2)(E) also receives roadway data from a data storage file 224(7)(2)(F) that indicates recommended curve driving responses. The data in this file 224(7)(2)(F) is based scientifically designed and developed responses for various curve and highway conditions. The process 224(7)(2)(E) provides an output to a process 224(7)(2)(G) that determines a type of curve/adjustment warning to provide. The process 224(7)(2)(G) also receives data indicating the vehicle position from the positioning system 210(1), data indicating the vehicle speed and the status of the vehicle brakes, tires, etc., from the vehicle status application 210(4), data indicating the driver's current behavior from the driver status application 210(6), and data indicating the driver's preferences from the driver profile data file 215(D). Based upon these inputs, the process 224(7)(2)(G) provides an output to the adaptive cruise control application 224(1) and/or the critical vehicle control system 230. The output to the adaptive cruise control application 224(1) may indicate a change in speed in order to safely maneuver through the upcoming curve in the road. The output to the critical vehicle control application 230 may indicate other modifications and/or adjustments for the vehicle operation. The process 224(7)(2)(G) also provides an output to the driver recorder 225 indicating that the upcoming curve was detected and the adjustment determined in response thereto, if any.

G. Drive Recorder

FIG. 29 shows the component processes that form the drive recorder 225 shown in FIG. 2. The drive recorder 225 obtains and logs information relating to all aspects of the vehicle and vehicle environment, including the driver and passengers. In FIG. 29, the drive recorder 225 includes a logging process 225(A) that receives current information streams from all the vehicle sensors 202, 204, and 304, all subsystem software 210 and 310, all the vehicle hardware 208 and 308, the communications manager 262, the vehicle-user device manager 270, as well as other managers, and the driver and user interface devices 250 and 350. The logging process 225(A) also receives event logs from all the applications 224 and 324.

The driver recorder 225 continuously stores a history of the vehicle and vehicle environment in a non-volatile secure data storage device. The drive recorder 225 includes a process 225(B) that provides all the logged data into a format and stores the formatted data onto a physical drive recorder medium 225(C). This data storage device may be in the vehicle or may be located remotely.

IV. Firewalls

Referring again to FIGS. 2 and 3, the in-vehicle architecture 100 includes two firewall systems. The first firewall system 214 is an internal firewall. The first firewall system 214 prevents interference with driver assistance systems 200 from other systems that are a part of the in-vehicle computing architecture 100. In particular, the first system firewall 214 provides selective isolation of the driver assistance systems 200 from the mobile services and information systems 300 and the user interface 350.

The first firewall 214 provides this function by preventing inappropriate information from crossing from the mobile services and information systems 300 (or other in-vehicle systems) to the driver assistance systems 200. This is intended to isolate the driver assistance processing, electronics, and associated programming, so that they are not affected by anomalous mobile services and information systems behavior, whether physical, electronic, or software-based. The first firewall system 214 includes both physical and logical barriers. These physical and logical barriers are provided by a combination of hardware and software components that isolate the driver assistance systems 200 from the rest of the systems that are part of the in-vehicle computing architecture 100.

Although the first firewall system 214 provides for selective isolation of the driver assistance systems 200 from the rest of the in-vehicle systems, limited interactions between the driver assistance systems 200 and the other in-vehicle systems are desirable in order to provide many of the advantages afforded by the in-vehicle architecture 100. For example, data captured by the sensors 202 and 204 that are part of the driver assistance systems 200 are made available to the mobile services and information systems 300. Similarly, route selections calculated on the mobile services and information systems 300 are used by some of the driver assistance system functions that use data about the intended path of the vehicle. However, it is important to assure that computational demands, system crashes, device anomalies, and software faults in the application-oriented mobile services and information systems 300 are not allowed to interfere with processing on the control/warning/safety-oriented driver assistance systems 200. Accordingly, the first firewall 214 provides for limited data flow to the driver assistance systems 200 from the other in-vehicle systems. The first firewall 214 performs this function by carefully controlling the types and volumes of information flows that are delivered to the driver assistance systems 200. For example, the data permitted to flow across the first firewall 214 from the mobile services and information systems to the driver assistance systems may be limited to specified formats known to be safe. Also, these data may be provided with identifiers that allow the driver assistance systems 200 to assign priorities to the data being received across the first firewall 214.

With reference to FIGS. 2 and 3, the second firewall system 219 is an external firewall. The external firewall system 219 provides protection of the entire in-vehicle computing system architecture 100 from interference from the outside world. The second firewall 219 is analogous to the kinds of firewalls that exist in Internet-connected office computer networks. Included among the functions provided by the external firewall system 219 are the blocking of viruses, the blocking of spurious messages, and the blocking of both deliberate and inadvertent external interference from reaching and/or affecting the in-vehicle computing system 100. Like the first firewall 214, the second firewall 219 provides selective isolation. The second firewall 219 allows certain kinds of data to pass from outside to the in-vehicle computing system 100, but limits and/or filters other kinds of data.

Like the internal firewall 214, the second or external firewall system 219 includes both physical and logical barriers provided by a combination of hardware and software components. In the case of the external firewall 219, the hardware and software components protect the entire in-vehicle system 100 from the outside environment.

The second firewall 219 has a connection to the communications system 262. The second firewall 219 also has connections to the driver assistance systems 200 and the mobile services and information systems 300. These connections enable data from the service provider 16 to be sent directly to these systems via the second firewall system 219. These kinds of data may include updates on conditions for the traffic and weather advisories system, for example.

V. Advantages of Disclosed Embodiments

The embodiments disclosed above demonstrate the advantages associated with building a data model once and then using the data model for applications that provide various features to the driver and passengers. By building the data model once, benefits are derived with respect to software efficiency, reliability, and consistency. The supporting sub-processes create a basic suite of constantly updated information for use by the different applications that access the information. The architecture also provides for hardware efficiency, reliability, and consistency. The architecture also uses the computational resources effectively.

In one embodiment, the components are implemented using simple, sharable chips that provide for mutual backup. The architecture also provides for essential priority management. The sensor data is provided consistently to multiple functions.

The architecture coordinates device management. Requests for resources are accepted from various functions and applications, such as the driver interface 250, the adaptive cruise control 224(1), the stability control 224(9), the obstacle avoidance application 224(12) and the collision avoidance application 224(13), etc. The architecture provides for the appropriate response based on all inputs and issues device control commands from a single point.

The architecture has the advantage of managing complexity, assuring reliability, promoting compatibility, achieving speed, and containing cost. Furthermore, the architecture provides the opportunity to enable complex, software-intensive applications while simplifying system development and integration. Another advantage is the simplification of system testing and validation without compromising reliability or integrity. Still another advantage is the facilitation of software upgrades and telematics services.

The disclosed computing architecture provides these advantages through the use of multiple cooperating processors, priority management, a fail-safe environment with hot backups, integrated sensor processing, integrated decision and control, and communications management.

Also assisting in providing these functions is the user device interface, vehicle device interface, the data buses, and the internal and external firewalls.

It is intended that the foregoing detailed description be regarded as illustrative rather than limiting and that it is understood that the following claims including all equivalents are intended to define the scope of the invention.

We claim:

1. A curve warning system implemented in a vehicle, the curve warning system comprising:
   a first group of sensor devices installed in the vehicle that sense features around the vehicle;
   a second group of sensor devices installed in the vehicle that sense vehicle hardware systems;
   a map database installed in the vehicle, wherein said map database includes data representing features in a geographic area around the vehicle, wherein said map database includes a curve valid road list;
   a positioning system that determines a location of the vehicle relative to features represented in the map database;
   data modeling programming that uses outputs from the first group of sensors, the second group of sensors, and the map database to construct a data model of the vehicle and the area around the vehicle;
   a driver interface from which a driver of the vehicle receives information; and
   a curve warning application that uses the data model to determine an appropriate vehicle operation through a curved portion of road ahead of the vehicle,
   wherein the curve warning application provides an indication to the driver via the driver interface if the vehicle is determined to be located outside a coverage area of the curve valid road list.

2. The system of claim 1 further comprising:
   an adaptive cruise control application that controls vehicle speed, wherein said curve warning application provides an output to said adaptive cruise control application and further wherein the adaptive cruise control application adjusts the vehicle speed based on the output from the curve warning application.

3. The system of claim 1 further comprising:
   a drive recorder that stores information from the first group of sensor devices and the second group of sensor devices in a non-volatile secure data storage device located in the vehicle,
   wherein said curve warning application provides an output to said drive recorder and further wherein the drive recorder stores data indicating curve detection by said curve warning application and the appropriate vehicle operation determined.

4. The system of claim 1 further comprising:
   a roadway data file stored in said vehicle, wherein said roadway data file contains recommended curve driving responses for various curve and highway conditions,
   wherein said curve warning application uses the data model and the roadway data file to determine the appropriate vehicle operation through the curved portion of road ahead of the vehicle.

5. The system of claim 1 further comprising:
   a driver profile stored in said vehicle, wherein said driver profile contains a listing of driver preferences,
   wherein said curve warning application uses the data model and the driver profile to determine the appropriate vehicle operation through the curved portion of road ahead of the vehicle.

6. The system of claim 1 further comprising:
   a route calculation application that receives indications of an origin and desired destination and determines at least one route from the origin to the destination; and
   a route guidance application that provides the driver with instructions for following the route determined by the route calculation application,
   wherein said curve warning application uses the data model and the route determined by the route calculation application to determine the appropriate vehicle operation through the curved portion of road ahead of the vehicle.

7. A curve warning system implemented in a vehicle, the curve warning system comprising:
   a first group of sensor devices installed in the vehicle that sense features around the vehicle;
   a second group of sensor devices installed in the vehicle that sense vehicle hardware systems;
   a map database installed in the vehicle, wherein said map database includes data representing features in a geographic area around the vehicle;
   a positioning system that determines a location of the vehicle relative to features represented in the map database;
   data modeling programming that uses outputs from the first group of sensors, the second group of sensors, and the map database to construct a data model of the vehicle and the area around the vehicle;
   a roadway data file stored in said vehicle, wherein said roadway data file contains recommended curve driving responses for various curve and highway conditions; and
   a curve warning application that uses the data model and the roadway data file to determine an appropriate vehicle operation through a curved portion of road ahead of the vehicle.

8. The system of claim 7 further comprising:
   an adaptive cruise control application that controls vehicle speed, wherein said curve warning application provides an output to said adaptive cruise control application and further wherein the adaptive cruise control application adjusts the vehicle speed based on the output from the curve warning application.

9. The system of claim 7 further comprising:
   a drive recorder that stores information from the first group of sensor devices and the second group of sensor devices in a non-volatile secure data storage device located in the vehicle,
   wherein said curve warning application provides an output to said drive recorder and further wherein the drive recorder stores data indicating curve detection by said curve warning application and the appropriate vehicle operation determined.

10. The system of claim 7 further comprising:
    a curve valid road list; and
    a driver interface from which a driver of the vehicle receives information;
    wherein the curve warning application provides an indication to the driver via the driver interface if the vehicle is determined to be located outside a coverage area of the curve valid road list.

11. The system of claim 7 further comprising:
    a driver profile stored in said vehicle, wherein said driver profile contains a listing of driver preferences,
    wherein said curve warning application uses the data model and the driver profile to determine the appropriate vehicle operation through the curved portion of road ahead of the vehicle.

12. The system of claim 7 further comprising:
    a route calculation application that receives an indication of a desired destination and determines at least one route from an origin to the destination; and a route guidance application that provides the driver with instructions for following the route determined by the route calculation application, wherein said curve warning application uses the data model and the route determined by the route calculation application to determine the appropriate vehicle operation through the curved portion of road ahead of the vehicle.

13. A method for providing a curve warning in a vehicle comprising:

sensing features around the vehicle with a first group of sensor devices installed in the vehicle;

sensing vehicle hardware systems with a second group of sensor devices installed in the vehicle, determining a location of the vehicle relative to features represented in a map database, wherein said map database includes data representing features in a geographic area around the vehicle and wherein said map database includes a curve valid road list, constructing a data model of the vehicle and the area around the vehicle using outputs from the first group of sensors, the second group of sensors, and the map database;

using the data model with a curve warning application run on a processor in the vehicle to determine an appropriate vehicle operation through a curved portion of road ahead of the vehicle; and providing an indication to the driver via an interface if the vehicle is determined to be located outside a coverage area of the curve valid road list.

14. The method of claim 13 further comprising:

providing an output from the curve warning application to an adaptive cruise control application that controls vehicle speed; and adjusting the vehicle speed based with the adaptive cruise control application based on the output from the curve warning application.

15. The method of claim 13 further comprising:

providing an output from the curve warning application to a driver recorder that stores a history of the vehicle and vehicle environment in a non-volatile secure data storage device located in the vehicle; and storing data with said driver recorder that indicates curve detection by said curve warning application and the appropriate vehicle operation determined.

16. The method of claim 13 further comprising:

with the curve warning application, using a roadway data file that contains recommended curve driving responses for various curve and highway conditions to determine the appropriate vehicle operation through the curved portion of road ahead of the vehicle.

17. The method of claim 13 further comprising: with the curve warning application, using a driver profile that contains a listing of driver preferences to determine the appropriate vehicle operation through the curved portion of road ahead of the vehicle.

18. The method of claim 13 further comprising:

receiving an indication of a desired destination;

calculating at least one route to the destination using the map database;

providing the driver with instructions for following the calculated route; and with the curve warning application, using the data model and the calculated route to determine the appropriate vehicle operation through the curved portion of road ahead of the vehicle.

19. A method for providing a curve warning in a vehicle comprising:

sensing features around the vehicle with a first group of sensor devices installed in the vehicle;

sensing vehicle hardware systems with a second group of sensor devices installed in the vehicle;

determining a location of the vehicle relative to features represented in a map database, wherein said map database includes data representing features in a geographic area around the vehicle;

constructing a data model of the vehicle and the area around the vehicle using outputs from the first group of sensors, the second group of sensors, and the map database; and with a curve warning application run on a processor in the vehicle, using the data model and a roadway data file stored in said vehicle, to determine an appropriate vehicle operation through a curved portion of road ahead of the vehicle, wherein said roadway data file contains recommended curve driving responses for various curve and highway conditions.

20. The method of claim 19 further comprising:

providing an output from the curve warning application to an adaptive cruise control application that controls vehicle speed; and adjusting the vehicle speed based with the adaptive cruise control application based on the output from the curve warning application.

21. The method of claim 19 further comprising:

providing an output from the curve warning application to a driver recorder that stores a history of the vehicle and vehicle environment in a non-volatile secure data storage device located in the vehicle; and storing data with said driver recorder that indicates curve detection by said curve warning application and the appropriate vehicle operation determined.

22. The method of claim 19 further comprising:

providing an indication to the driver via an interface if the vehicle is determined to be located outside a coverage area of a curve valid road list.

23. The method of claim 19 further comprising:

with the curve warning application, using a driver profile that contains a listing of driver preferences to determine the appropriate vehicle operation through the curved portion of road ahead of the vehicle.

24. The method of claim 19 further comprising:

receiving an indication of a desired destination;

calculating at least one route to the destination using the map database;

providing the driver with instructions for following the calculated route; and with the curve warning application, using the data model and the calculated route to determine the appropriate vehicle operation through the curved portion of road ahead of the vehicle.

* * * * *